(12) United States Patent
Carter et al.

(10) Patent No.: US 8,783,281 B2
(45) Date of Patent: Jul. 22, 2014

(54) FUEL TANK TEMPERATURE AND PRESSURE MANAGEMENT VIA SELECTIVE EXTRACTION OF LIQUID FUEL AND FUEL VAPOR

(75) Inventors: Nicholas Carter, Fairfield (AU); Richard W. Hurley, Glen Waverly (AU); Mark D. Archer, Carlton North (AU); Alec G. Woolley, Richmond (AU); Jon D. Edsell, North Warrandyte (AU)

(73) Assignee: GM Global Technology Operations LLC, Detroit, MI (US)

( * ) Notice: Subject to any disclaimer, the term of this patent is extended or adjusted under 35 U.S.C. 154(b) by 360 days.

(21) Appl. No.: 12/880,461

(22) Filed: Sep. 13, 2010

(65) Prior Publication Data

US 2012/0060935 A1 Mar. 15, 2012

(51) Int. Cl.
*F02M 21/06* (2006.01)
*F02M 37/00* (2006.01)
*F23N 1/00* (2006.01)

(52) U.S. Cl.
USPC ....... 137/206; 137/565.16; 123/304; 123/525

(58) Field of Classification Search
CPC .......... F23N 1/00; F02M 37/00; F02M 21/06; Y02T 10/32; F02B 43/10; F02N 99/00
USPC ......... 137/206, 565.11, 565.16; 123/304, 525
See application file for complete search history.

(56) References Cited

U.S. PATENT DOCUMENTS

| 4,475,348 | A | | 10/1984 | Remes |
|---|---|---|---|---|
| 5,081,977 | A | * | 1/1992 | Swenson ........................ 123/527 |
| 5,373,702 | A | | 12/1994 | Kalet et al. |
| 5,479,906 | A | | 1/1996 | Collie |
| 5,771,946 | A | | 6/1998 | Kooy et al. |
| RE35,874 | E | * | 8/1998 | Neeser et al. ........................ 62/7 |
| 6,354,088 | B1 | | 3/2002 | Emmer et al. |
| 6,622,758 | B2 | | 9/2003 | Drube et al. |
| 7,703,445 | B2 | * | 4/2010 | Haga .............................. 123/525 |
| 8,459,241 | B2 | * | 6/2013 | Dixon et al. .................. 123/525 |

FOREIGN PATENT DOCUMENTS

| JP | 6-213400 | 8/1994 |
|---|---|---|
| KR | 2002-80772 | 10/2002 |
| WO | WO9810186 A1 | 3/1998 |
| WO | WO2008141390 A1 | 11/2008 |

OTHER PUBLICATIONS

"Industrial Microhydraulics" Product Data Sheet for 832 Series Side Exit Check Valve, Forward Flow Check Valve, 1 pg., The Lee Company—IMH Group, Westbrook, CT 06498, dated 2009.
"Industrial Microhydraulics" Product Data Sheet for 832 Series Side Exit Check Valve, Reverse Flow Check Valve, 1 pg., The Lee Company—IMH Group, Westbrook, CT 06498, dated 2009.

(Continued)

*Primary Examiner* — Craig Schneider

(57) ABSTRACT

A method and apparatus for managing temperature and pressure of fuel in a fuel tank stored at or near its vapor pressure. In response to fuel feed pressure, a variable ratio of liquid fuel to fuel vapor is extracted from the fuel tank in order to regulate temperature and pressure of the fuel for the purpose of keeping the pressure lower in anticipation of refilling or to assist a vaporizer of the fuel system which is incompletely vaporizing the fuel.

20 Claims, 14 Drawing Sheets

(56) References Cited

OTHER PUBLICATIONS

"Industrial Microhydraulics" Product Data Sheet for Lee IMH 8 mm Shuttle Valve, 2 pgs., The Lee Company—IMH Group, Westbrook, CT 06498, dated Aug. 2008.

SAE Technical Paper 981388 "The Effects of Fuel Composition, System Design, and Operating Conditions on In-System Vaporization and Hot Start of a Liquid-Phase LPG Injection System" by Barry R. Lutz, et al, dated May 1998.

Korean Office Action, dated Dec. 20, 2012 for for Korean application No. 10-2011-0090639, corresponding to U.S. Appl. No. 12/880,461.

Australian Office Action dated May 13, 2013 for AU application 2011205145, corresponding to U.S. Appl. No. 12/880,461.

* cited by examiner

FUEL TANK TEMPERATURE AND PRESSURE MANAGEMENT VIA SELECTIVE EXTRACTION OF LIQUID FUEL AND FUEL VAPOR

TECHNICAL FIELD

The present invention relates to the temperature and pressure management of fuel supply systems where fuel is stored in a fuel tank (or vessel) at, or close to, the vapor pressure of the fuel.

BACKGROUND OF THE INVENTION

Motor vehicle designers continually strive to create vehicles which have lower emissions of noxious and greenhouse gases than vehicles currently in use. One means of reducing vehicular emissions is to utilize alternative fuels. Commonly used fuels, such as gasoline and diesel fuel, are mixtures of complex hydrocarbons which may also contain unwanted chemicals, such as sulfur. One form of alternative fuel, for non-limiting example, is liquefied petroleum gas (LPG). LPG is primarily composed of propane, a three carbon hydrocarbon, and butane, a four carbon hydrocarbon. These hydrocarbons have a lower carbon to hydrogen ratio than gasoline or diesel fuel. Because the carbon to hydrogen ratio is lower, less carbon dioxide is produced in the burning of LPG than in the burning of gasoline or diesel fuel. The longer chain hydrocarbons of gasoline and diesel fuel are also more likely to produce unwanted particulate emissions in the exhaust gas. Relative to LPG, gasoline and diesel fuel do have two advantages, namely: (i) both gasoline and diesel fuel are liquids at standard temperature and pressure (STP), whereas under typical ambient operating conditions LPG must be stored in a pressure vessel to be kept in a liquefied state; and, (ii) gasoline and diesel fuel produce more energy per unit volume of fuel as compared to LPG, even when LPG is in a liquid state.

System functionality of prior art fuel systems utilizing alternative fuels is generally as follows. Fuel is supplied to a fuel consumer via a vaporizer and pressure regulator (vaporizer-regulator). The fuel comes from a fuel tank which stores the fuel at, or near, its vapor pressure. The fuel supplied to the vaporizer-regulator consists of liquid fuel, fuel vapor or a mixture of liquid fuel and fuel vapor. Under normal operating conditions, the fuel supplied to the vaporizer-regulator consists predominantly of liquid fuel, but may also include some fuel vapor. Under unusual operating conditions (e.g., when the fuel tank is nearly empty), the fuel supplied to the vaporizer-regulator may consist mostly, or entirely, of fuel vapor. Under normal operating conditions, the fuel supplied to the vaporizer-regulator meets a minimum fuel feed pressure requirement at the vaporizer-pressure regulator. This minimum fuel feed pressure is the pressure required to ensure that the vaporizer-regulator will function correctly and that the target fuel feed pressure downstream of the pressure regulator can be maintained to supply the fuel demand of the fuel consumer. For some prior art fuel system embodiments, the minimum fuel feed pressure requirement may vary, depending on factors such as the backpressure at the fuel consumer, the flow rate of fuel to the fuel consumer, the density of the fuel supplied to the fuel consumer, or the rate of energy flow out of the fuel consumer (e.g., if the fuel consumer is an internal combustion engine, the minimum fuel feed pressure requirement may depend on the inlet manifold pressure, fuel flow rate, fuel density, driveshaft torque, power output and/or rotational speed). Some prior art embodiments may be fitted with a fuel pump to increase the fuel feed pressure in circumstances where the vapor pressure of the fuel in the fuel tank is not large enough to meet the minimum fuel feed pressure requirement at the vaporizer-regulator.

In general, prior art fuel systems utilizing alternative fuels must address the following functionality requirements: 1) meet the minimum fuel feed pressure requirement at the vaporizer-regulator (wherein, this minimum fuel feed pressure requirement may vary, depending on various factors, such as the backpressure at the fuel consumer, the flow rate of fuel to the fuel consumer, the density of fuel supplied to the fuel consumer, or the rate of energy flow out of the fuel consumer); and 2) meet minimized operation and/or duty cycle of fuel pumping system (wherein, the objective is to reduce noise generated by fuel pumping and/or reduce electrical energy consumption and/or increase service life of the fuel pumping system).

FIGS. 1A and 1B depict examples of typical prior art LPG fuel systems 10, 10', wherein identical numbers are used for referencing identical parts, and wherein FIG. 1B is truncated for brevity. These prior art LPG fuel systems are of the gaseous-phase manifold-injection type, as for example utilized by an internal combustion engine of, for example, a motor vehicle, wherein the system meters LPG fuel into the inlet manifold of the engine in the gaseous phase.

A pressurized fuel tank (or vessel) 12 holds LPG fuel contents 15 in liquid phase 15' and vapor phase 15". The fuel tank 12 is equipped with a tank pressure relief valve 13, and may be equipped with a temperature sensor 14 and a pressure sensor 16. The LPG fuel 15 of the fuel tank 12 may be subject to external heat 17, as for example coming from the motor vehicle exhaust system outside the fuel tank, and in the example of FIG. 1, to heat 19 from components within the fuel tank, as for example due to operation of the fuel pump 26, wherein all of these sources of heat increase the temperature of the LPG fuel 15, thereby increasing the vapor pressure inside the fuel tank.

Contained within the fuel tank 12 are, in the example of FIG. 1A, components that make up the fuel line pumping system 18, and in the example of FIG. 1B, simply a filter 24 at a lead end of the fuel line 22. In both the examples of FIGS. 1A and 1B, liquid phase fuel 15' of the LPG fuel 15 is extracted via the fuel line 22 after first passing through the filter 24 in order to prevent debris from entering the fuel line.

In the example of FIG. 1A, the filter 24 connects to the fuel pump 26. The fuel pump 26 is typically engaged to boost fuel feed pressure when the pressure inside the fuel tank 12 is below a predetermined level, as for example a pressure of 3 bar (absolute). After passing through the fuel pump 26 the fuel passes through a check valve 25 and then through a filter 28. A fuel pressure regulator 20 controls the pressure differential across the pump 26 and the fuel filter 28 so that a desired fuel pressure differential is maintained, as for example, a pressure differential of about 2.5 bar. Fuel filter 24 is located upstream of fuel pump 26 and has low pressure resistance so as to minimize cavitation inside the fuel pump. Fuel filter 24 may take the form of a strainer, while fuel filter 28, by contrast, is a finer filter, designed to prevent debris passing into the fuel system components downstream of fuel pump 26 and its check valve 25. The pressure drop across fuel filter 28 can be larger than the pressure drop across fuel filter 24 because fuel filter 28 is located downstream of fuel pump 26, and, therefore, fuel pump cavitation will not occur due to the pressure drop across fuel filter 28.

In the examples of both FIGS. 1A and 1B, the fuel line 22 connects to a valve set 36 which is ordinarily mounted on the wall of the fuel tank. The valve set 36 typically includes: a flow control valve 30 for preventing excessive flow in the event of accidental rupture of the downstream fuel line; a service valve 32 which is always open during the normal operations of the vehicle, but when the vehicle is being serviced, a technician can turn off the service valve 32 manually to thereby isolate the fuel tank 12 and related structures from the rest of the fuel line of the vehicle; and an automatic fuel shut-off solenoid valve 34 which is typically controlled by a controller or electronic control module (ECM), not shown, wherein the controller coordinates information from one or more sensors, not shown, in order to detect conditions that require a shut down of the fuel flow through the fuel line 22. A typical example of such a condition is when the driver switches engine ignition 'off'.

The fuel line 22 then connects to another automatic fuel shut off solenoid valve 40, wherein the controller thereof, also not shown, coordinates information from one or more sensors, not shown, in order to detect conditions that require a shut down of the fuel flow through the fuel line 22. After passing through the shut off solenoid valve 40, the fuel passes into a vaporizer-regulator 38. The vaporizer 44 thereof typically includes a heat exchange circuit 46 where heat is extracted from the engine cooling system 46a for the purpose of converting fuel which is in a liquid or vapor phase to a superheated gaseous phase. The fuel may also be heated by an electric heater 48a, wherein the heat exchanger which exchanges heat with the engine coolant is often the same as the heat exchanger which exchanges heat with the electric heater. This device provides the additional heat necessary to fully vaporize the fuel to a superheated gaseous state during engine warm-up, when the engine cooling system is still relatively cold. The gaseous fuel then passes into a pressure regulator 50 of the vaporizer-regulator 38, wherein the pressure regulator controls the pressure of the fuel in the fuel rail 54 and is typically referenced to inlet manifold pressure; for example, the pressure regulator 50 may maintain a pressure differential of 1 bar between inlet manifold pressure and fuel rail pressure. The final component of the vaporizer-regulator 38, or as a stand-alone component, is a pressure relief valve 52 which prevents the pressure of the gas in the fuel rail exceeding a predetermined level, typically opening at between 2 and 3 bar, which could arise under certain operating conditions, such as when there is no flow of the fuel out of the fuel rail. If the pressure of the gaseous fuel in the fuel rail exceeds this predetermined level, then the pressure relief valve 52 opens and releases excess fuel from the downstream side of the pressure regulator 50 to a lower-pressure location such as the engine inlet manifold, not shown. It should be noted that the pressure relief valve 52 is separate and different from the aforementioned pressure relief safety valve 13 fitted to the fuel tank 12, which will typically open at between 26 and 28 bar.

Once the gaseous fuel passes the pressure relief valve 52, it enters a fuel rail 54 which serves to distribute the fuel to the cylinders 64a-64f of the engine 70, wherein the engine, which serves in the capacity of a fuel consumer in this application, may have any number of cylinders, six being shown merely by way of example, and wherein each cylinder possesses a fuel injector 56a-56f which is typically controlled by a controller or ECM, not shown. The fuel rail 54 may also be provided with a temperature sensor 60 and a pressure sensor 62 so that the data therefrom may be used by the engine system controller, not shown.

FIG. 1C shows an example of an algorithm 80 indicative of typical steps for the operation of the prior art LPG gaseous-phase manifold-injection fuel system 10 of FIG. 1A.

At Block 82, the system is initialized when the fuel consumer is turned on, e.g., the ignition switch starts the engine 70. The algorithm then advances to Block 84, whereat data may be obtained by sensors, calculated or obtained from a look-up table, including the fuel feed pressure at or upstream of the vaporizer-regulator 38. The algorithm then advances to Decision Block 86, whereat inquiry is made as to whether fuel pumping is required in order to supply a minimum fuel feed pressure to the vaporizer-regulator which satisfies the fuel demand of the fuel consumer. If the answer to the inquiry is yes, then at Block 88 fuel pumping is activated, or if already activated then fuel pumping remains activated, and the algorithm returns for Block 84. However, if the answer to the inquiry at Decision Block 86 is no, then the algorithm proceeds to Block 90, whereat fuel pumping remains deactivated, or if already activated then fuel pumping is deactivated. The algorithm then returns to Block 84.

One issue which can be encountered with prior art LPG fuel systems, as well as other pressurized fuel systems in general, concerns refilling (or refueling) when the pressure within the fuel tank is too high relative to the pressure at the nozzle of the bowser (or refilling station) to permit reasonably rapid refilling, or indeed, too high to permit any refilling (a no-fill situation). For rapid refilling to occur, the pressure of the bowser nozzle should be well in excess of the fuel vapor pressure within the fuel tank. As this pressure differential becomes smaller, so too does the rate of refilling become smaller. Thus, it is desirable for the vapor pressure in the fuel tank to be at or below a predetermined vapor pressure threshold by which it is deemed that a desired rate of refilling will be provided, as per an anticipated pressure of the bowser nozzle. This concern is exacerbated for fuels having multiple components of varying volatility.

Another issue which can be encountered in prior art LPG fuel systems, as well as other pressurized fuel systems in general, concerns delivery of vapor to the fuel consumer thereof during cold episodes (as for example a cold engine start in cold weather), wherein the ability of the vaporizer to provide complete fuel vaporization may be less than required to achieve 100% fuel vaporization at a mass flow rate demanded of the fuel consumer, whereby the consumer could become starved of fuel.

Accordingly, some means of managing the temperature and/or the pressure of the fuel inside the fuel tank is desirable in order to limit the maximum vapor pressure inside the fuel tank with speed and ease of fuel tank refilling in mind, while also having some ability to extract vapor as an assist to the vaporizer.

SUMMARY OF THE INVENTION

Although different methods of managing the fuel tank temperature are possible, one attractive method, from a cost to benefit perspective, is to remove a portion of the fuel from the fuel tank in its vapor phase. Accordingly, the present invention is a fuel tank temperature and pressure management system, which selectively extracts from the fuel tank liquid, vapor, and/or liquid and vapor of the fuel, wherein the extraction of fuel vapor upsets the vapor-liquid equilibrium inside the fuel tank, causing additional vaporization of liquid fuel inside the fuel tank with consequent absorption of latent heat of vaporization by the vaporized fuel, thus cooling the fuel inside the fuel tank and/or fuel tank structure and reducing the vapor pressure inside the fuel tank.

By way of non-limiting example, like the aforementioned prior art gaseous-phase manifold-injection LPG fuel systems, the present invention supplies fuel to a fuel consumer via a vaporizer and pressure regulator (vaporizer-regulator); however, in contrast thereto, the present invention supplies the fuel to the vaporizer-regulator, under at least some operating conditions, e.g., where the vapor pressure in the fuel tank is greater than the minimum fuel feed pressure requirement of the vaporizer-regulator, as a variable ratio of liquid fuel to fuel vapor in the fuel feed upstream of the vaporizer so as to provide additional functionality over the prior art, namely: i) management of the temperature and, hence, the vapor pressure of the fuel in the tank to reduce the likelihood of a no-fill situation and/or reduce the time required to fill the fuel tank; and/or ii) increase the proportion of fuel vapor in the fuel feed to the vaporizer-regulator under operating conditions in which it may be undesirable, difficult or impossible for the vaporizer to provide sufficient heat energy to reliably vaporize all of the liquid fuel which would otherwise enter the vaporizer (e.g., in the event of occurrence of a cold episode, or as an assist to the vaporizer if the fuel heater within the vaporizer is functionally inadequate to meet mass flow demand of the fuel consumer).

In general, the fuel systems according to the present invention must address the following functionality requirements in addition to those of the prior art: 1) meet increased proportion of fuel vapor in the fuel feed to the vaporizer-regulator under operating conditions in which it may be undesirable, difficult or impossible for the vaporizer to provide sufficient heat energy to reliably vaporize all of the liquid fuel which would otherwise enter the vaporizer; 2) meet management of the temperature and, hence, vapor pressure of the fuel in the fuel tank in order to reduce the likelihood of a no-fill situation; 3) meet management of the temperature and, hence, vapor pressure of the fuel in the fuel tank in order to reduce the time required to re-fill (re-fuel) the fuel tank; and 4) meet minimized operation and/or duty cycle of fuel flow control unique to the present invention, wherein the objective is to reduce noise generated by fuel flow control and/or reduce electrical energy consumption and/or increase service life of the fuel flow control(s).

Fuel systems pertaining to the present invention utilize a fuel tank having fuel contents generally in both the liquid and vapor phase, wherein the fuel storage pressure is at, or close to, the vapor pressure of the fuel. Fuels which may be stored this way include, but are not limited to: propane, butane, liquefied petroleum gas (LPG), and dimethyl ether. Application of the present invention is intended to include all such fuel systems which store fuel at, or close to, the vapor pressure of the fuel, and the exemplar LPG fuel systems presented herein are merely for purposes of illustration. Thus, any reference herein to 'LPG' should be widely taken to mean any fuel stored at or near its vapor pressure' and not as restricting the scope of the present invention to LPG fuel systems. Similarly, reference herein to motor vehicle fuel systems should not be taken as restricting the scope of the invention thereto, as the present invention applies to any gaseous phase fuel system application utilizing a fuel consumer which may or may not be an internal combustion engine.

Fuels which are stored at, or close to the vapor pressure of the fuel may be multi-component mixtures (for example, LPG is typically a mixture of multiple components including propane, butane and other hydrocarbons). In the case of such multi-component fuel mixtures, there may be small differences between the chemical composition of the fuel vapor and of the liquid fuel in the same fuel tank. Furthermore, it may also be the case that the chemical composition of the fuel vapor in the fuel tank varies to a greater extent than the chemical composition of the liquid fuel in the fuel tank as the fuel tank is emptied. (For a discussion of the technical reasons behind these chemical composition differences, refer to SAE technical paper 981388 'The Effects of Fuel Composition, System Design and Operating Conditions on In-System Vaporization and Hot-Start of a Liquid-Phase LPG Injection System' by Lutz et al). These chemical composition differences may, in turn, result in small differences in fuel energy content and stoichiometric air to fuel ratio as the fuel feed is switched from fuel which is mostly in a liquid phase to fuel which contains a larger amount of vapor phase, or vice-versa, in accordance with the present invention. However, fuel consumers which burn fuel composed of multi-component mixtures are typically tolerant, within limits, to fuel composition variation. Such systems will typically also be tolerant to the variation in chemical composition caused by switching from fuel which is mostly in a liquid phase to fuel which is mostly in a vapor phase. However, in some applications, it is possible that the rate of switching between fuel which is mostly in a liquid phase to fuel which is mostly in a vapor phase may need to be limited to prevent potential problems associated with sudden 'step' changes in fuel composition.

Another aspect of LPG and other fuels which are stored at vapor pressure and which typically have multiple chemical components, is that the chemical components will each have differing vapor pressures. Examples of high vapor pressure components which may be present in LPG fuels include: ethane, nitrogen and carbon dioxide; and tank manufacture or servicing may introduce air (or other contaminant gases such as nitrogen used for leak detection) into the tank, which may not have been completely purged out. The vapor pressure inside the fuel tank is the vapor pressure of the fuel mixture, however the individual chemical components may have a vapor pressure which is higher or lower than the vapor pressure of the mixture. Because high vapor pressure chemical components have an increased tendency to remain in their gaseous phase and therefore 'compress' rather than 'condense' as the pressure inside the fuel tank increases, ability to refill the tank is adversely affected. Advantageously, the present invention provides: 1) the ability to selectively remove high vapor pressure chemical components at a faster rate than can be achieved with a prior art fuel systems which typically draw only liquid fuel from the fuel tank, rendering the fuel system more tolerant to fuel composition variation vis-a-vis refilling problems; 2) ability to remove contaminant chemical components after manufacture or servicing; and 3) ability to selectively retain high vapor pressure components inside the fuel tank (i.e., similar to the retention of high vapor pressure components by a prior art liquid-feed fuel system), which may be for example desirable under low-temperature operating conditions when a high fuel tank pressure will help to reduce the need to increase the pressure by alternative means (e.g., by activating a fuel pump).

The fuel tank temperature and pressure management system according to the present invention may be implemented, by way of example, in conjunction with a prior art gaseous-phase manifold-injection LPG fuel system, as exemplified at FIGS. 1A and 1B, having been modified according to the present invention, or may be implemented otherwise.

The fuel tank temperature and pressure management system of the present invention utilizes a first fuel feed line (referred to herein as "FF1") which provides all, or ordinarily predominantly all, liquid fuel; a second fuel feed line (referred to herein as "FF2") which provides all, or predominantly all, fuel vapor; a junction fluidically connecting FF1 to FF2 and to the downstream prior art fuel system; and a fuel flow control of at least one of FF1 and FF2 to thereby selectively extract: (i) fuel vapor; (ii) liquid fuel; or (iii) liquid fuel and fuel vapor, preferably in variable mass-flow ratios, from the fuel tank to the vaporizer-regulator, wherein the vapor source is the native vapor within the fuel tank; or wherein in an alternative embodiment, the vapor source is provided by an in-tank evaporator system.

In accordance with the present invention, cooling by latent heat of vaporization and/or expansion, and/or heating (e.g., from running of the fuel pump and/or other electrical devices which are inside the fuel tank or otherwise thermally connected to the fuel tank) are collectively utilized to control the temperature and, hence, the vapor pressure of the fuel inside the fuel tank.

Accordingly, it is an object of the present invention to provide a fuel tank temperature and pressure management system for supplying fuel to a vaporizer-regulator that is connected downstream to a fuel consumer, wherein the fuel is in the form of a selected relative proportion of saturated liquid fuel and fuel vapor, wherein the ratio of liquid fuel to fuel vapor is actively controlled to provide: i) management of the vapor pressure in the fuel tank to facilitate fast and rapid refilling (or refueling); and/or ii) supply fuel vapor to the vaporizer-regulator as an assist to the vaporizer.

This and additional objects, features and advantages of the present invention will become clearer from the following specification of a preferred embodiment.

DESCRIPTION OF THE PREFERRED EMBODIMENT

Figure 1A:
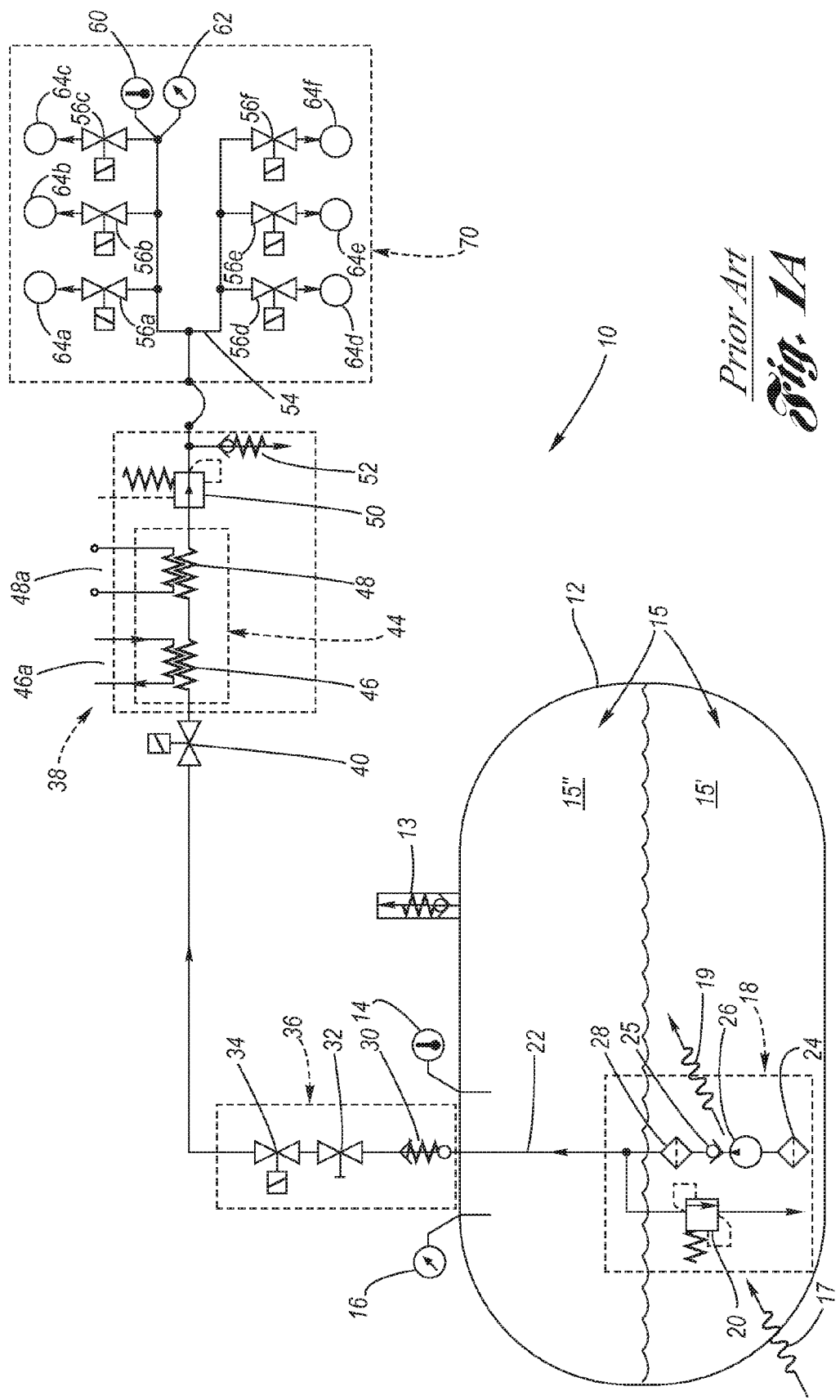
FIG. 1A is a schematic diagram of a prior art gaseous-phase manifold-injection LPG fuel system for a motor vehicle which includes a fuel pump.

Referring now to the Drawings, FIGS. 2 through 14 depict aspects for implementing a fuel tank temperature and pressure management system according to the present invention in conjunction with, merely by way of exemplification, a modified prior art gaseous-phase manifold-injection LPG fuel system for a motor vehicle, it being understood the present invention may be implemented otherwise and may or may not involve an internal combustion engine as the fuel consumer. In this regard as mentioned above, it should be kept in mind that the preferred implementation described herein with respect to an LPG fuel system should be read as being expansively applicable to any fuel system which stores fuel at, or close to, the vapor pressure of the fuel. By way of non-limiting example, such fuels include, but are not limited to: propane, butane, liquefied petroleum gas (LPG), and dimethyl ether. Thus, any references to 'LPG' should be widely taken to mean 'fuel' and not as restricting the scope of the present invention to LPG fuel systems. Similarly, references to motor vehicle fuel systems should not be taken as restricting the scope of the invention thereto, as the present invention applies to any gaseous phase fuel system application.

One aspect addressed by the present invention relates to facilitation of refilling (or refueling) of the fuel tank. For rapid refilling to occur, the pressure of the bowser (refilling pump) nozzle should be well in excess of the fuel vapor pressure within the fuel tank. As the fuel vapor pressure within the tank approaches the bowser nozzle pressure, the rate of refilling decreases and, if the fuel vapor pressure becomes high enough relative to the bowser nozzle pressure, refilling may become impossible. Impossible to refill, or no-fill situations, in which fuel cannot flow from the bowser nozzle into the fuel tank because of excessive backpressure caused by the fuel vapor pressure within the tank, are highly undesirable. If such a no-fill situation is encountered, then a technique used in the prior art to overcome this problem is to cool the contents of the fuel tank down in order to reduce the vapor pressure inside the fuel tank. Methods of the prior art to do this include pouring cold water over the fuel tank or placing ice or wet rags on the fuel tank. Such methods can be difficult and time-consuming to implement, and may be unacceptable, impractical or unavailable, depending on the circumstances.

Concern over ability to refill the fuel tank is exacerbated for fuels having multiple chemical components of varying volatility. LPG and other fuels which are stored at vapor pressure typically have multiple chemical components, each having differing vapor pressures. Examples of high vapor pressure components which may be present in LPG fuels include: ethane, nitrogen and carbon dioxide; and manufacture or servicing may introduce air (or other contaminant gases such as nitrogen used for leak detection) into the tank, which may not have been completely purged out. The vapor pressure inside the fuel tank is the vapor pressure of the fuel mixture, however the individual chemical components may have a vapor pressure which is higher or lower than the vapor pressure of the mixture. If the vapor pressure of a chemical component is higher than the mixture, then the component will tend to remain in its gaseous phase and the concentration (mole fraction) of that chemical component will be higher in the vapor phase relative to the liquid phase. Conversely, if the vapor pressure of a chemical component is lower than the mixture, then the concentration (mole fraction) of that chemical component will be lower in the vapor phase relative to the liquid phase. The chemical composition of the vapor phase inside the fuel tank will typically be different to the chemical composition of the liquid phase, because the vapor phase will contain a higher concentration (mole fraction) of high vapor pressure chemical components relative to the liquid phase. As a result, the rate at which high vapor pressure chemical components can be withdrawn from the fuel tank is less when liquid fuel is extracted as compared to when fuel vapor is extracted. Accordingly, as a fuel tank is emptied, the final vapor pressure will be related to the ratio of the chemical components, and that will depend upon the ratio of the liquid fuel to fuel vapor extracted. If high volatility (high vapor pressure causing) chemical components have been favored to remain in their gaseous phase and therefore 'compress' rather than 'condense' as the pressure inside the fuel tank increases, ability to refill the fuel tank is adversely affected. If the fuel tank pressure approaches the bowser nozzle pressure before the fuel tank can be filled up, then it will not be possible to fully refill (refuel) the fuel tank. Thus, if high vapor pressure components are allowed to accumulate inside a fuel tank, then the rate of refilling will be slow, or refilling may even be prevented (a no-fill situation). This problem is exacerbated for the next refill if during the present refill, a relatively larger quantity of high vapor pressure chemical components are added to the fuel tank than will be removed during operation of the fuel consumer. Therefore, it is desirable to keep the concentration of high vapor pressure chemical components at low levels in the fuel supplied; however, this may impose increased fuel costs, and the desired low levels from the perspective of fuel tank refilling, may not always be met in practice.

During refilling, fuel from a bowser supply tank is typically supplied to the bowser nozzle. In the case of fuels which are stored at, or near their vapor pressure, the pressure in both the bowser supply tank and the fuel tank being refilled (refueled) will be close to the vapor pressure of the fuel, and both tanks will contain a mixture of liquid fuel and fuel vapor.

Variables which can affect the likelihood of a no-fill situation include: 1) the pressure differential across the bowser; 2) the height of the liquid fuel level in the bowser supply tank, relative to that of the fuel tank being refilled (for example, the bowser supply tank may be located underground, whereas the fuel tank being refilled is typically located above ground); 3) the chemical composition of the fuel in the bowser supply tank (fuel vapor pressure varies with chemical composition and the feed pressure at the bowser nozzle, may be reduced if the bowser supply tank contains low vapor pressure fuel); 4) the temperature of the fuel in the bowser supply tank (a lower fuel temperature will reduce the vapor pressure in the bowser tank and hence the feed pressure at the bowser nozzle; 5) the chemical composition of fuel in the fuel tank being refilled (fuel vapor pressure varies with chemical composition and the backpressure at the bowser nozzle to fuel tank interface will increase if the fuel tank being refueled contains high vapor pressure fuel); and, 6) the temperature of fuel in the fuel tank being refilled (a high fuel temperature will increase the backpressure at the bowser nozzle to fuel tank interface). Control of the fifth and sixth variables is the focus of the present invention.

Factors which can affect this sixth variable (the temperature of the fuel in the fuel tank being refilled) include: 1) ambient temperature (higher ambient temperature tends toward higher fuel temperature), 2) proximity of the exhaust system to the fuel tank (reduced separation typically results in increased heat transfer to the fuel tank), 3) engine load (a higher engine load can result in increased heat transfer from the exhaust system to the fuel tank, 4) airflow over the fuel tank (increased airflow results in better convective cooling), and 5) engine run time (a longer time may translate to more heat transfer to the fuel tank.

Figure 1B:
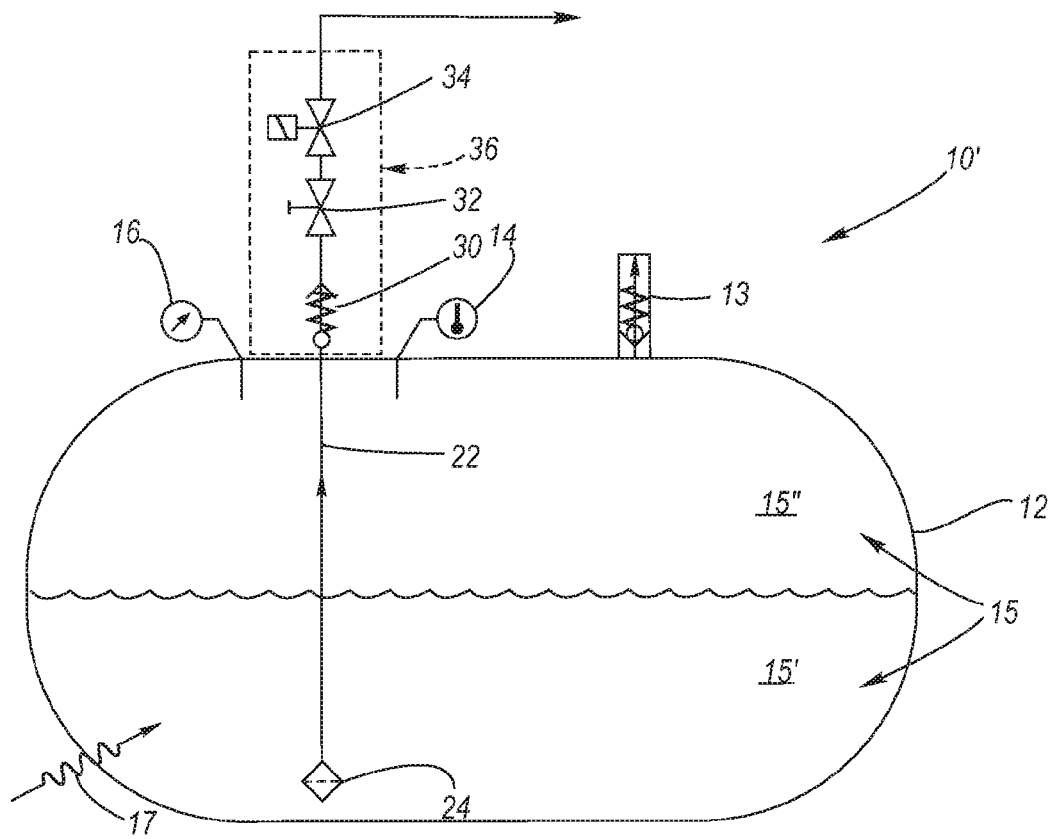
FIG. 1B is a partly truncated schematic diagram of a prior art gaseous-phase manifold-injection LPG fuel system for a motor vehicle as in FIG. 1A, but does not include a fuel pump.
Figure 2:
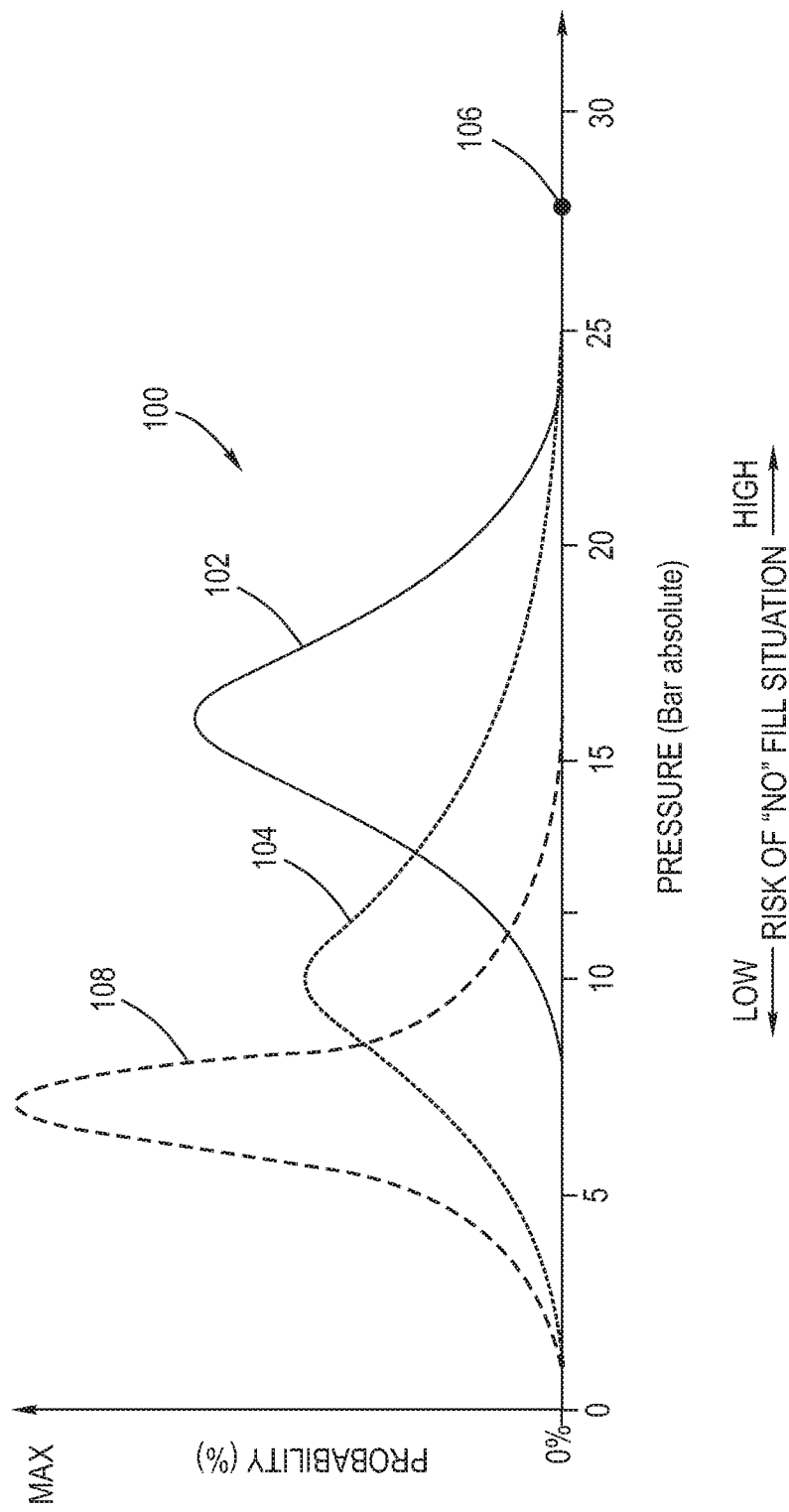
FIG. 2 is a comparative graphical depiction of: 1) an example of the probability distribution of fuel pressure inside the fuel tank in accordance with a prior art fuel system, 2) an example of the probability distribution of the fuel feed pressure of a bowser, and 3) an example of the effect of the present invention on the probability distribution of the fuel pressure inside the fuel tank.

FIG. 2 is a graph 100 of probability versus pressure, which exemplifies how refilling (or refueling) of an LPG fuel tank may be affected by the vapor pressure within the fuel tank. Distribution curve 102 represents a hypothetical probability distribution of bowser nozzle pressure of a bowser (or fuel supply station), and distribution curve 104 represents a hypothetical probability distribution of the fuel vapor pressure within an LPG fuel tank under prior art operational conditions, both immediately prior to commencement of refilling, and wherein point 106 represents the pressure at which the fuel tank pressure relief valve 13 (depicted on FIG. 1A and FIG. 1B) opens. Both distribution curves 102, 104 are affected by factors such as ambient temperature and fuel chemical composition, which can vary from fill-to-fill and from market-to-market. By way of example only, to facilitate fuel flow from the bowser nozzle into the fuel tank, the bowser nozzle pressure should be greater than preferably about 5 bar or more over that of the fuel vapor pressure inside the fuel tank, in order to facilitate rapid refilling of the fuel tank in a filling station environment.

Distribution curve 108 represents a hypothetical probability distribution of fuel vapor pressure within an LPG fuel tank under operational conditions according to the fuel tank temperature and pressure management system of the present invention, wherein the present invention provides: 1) the ability to vary the ratio of liquid fuel to fuel vapor extracted from the fuel tank in order to regulate the temperature and hence pressure of the fuel inside the tank; 2) the ability to extract high vapor pressure chemical components at a faster rate than can be achieved by prior art liquid-feed fuel systems (e.g. FIGS. 1A and 1B), rendering the fuel system more tolerant to fuel quality variation vis-a-vis refilling problems; 3) the ability to remove gaseous-phase contaminant chemical components after manufacture or servicing; as well as 4) selective retention of high vapor pressure components inside the fuel tank (i.e., similar to the retention of high vapor pressure components by prior art fuel systems which typically draw only liquid fuel from the fuel tank), which may be, for example, desirable under low temperature operating conditions when a high fuel tank pressure will help to reduce the need to increase the pressure by alternative means (e.g., by activating a fuel pump).

Turning attention now to FIGS. 3 through 5C, a broad example of the fuel tank temperature and pressure management system according to the present invention will be detailed which appertains to selective removal of native fuel vapor of the fuel in the fuel tank.

Figure 3:
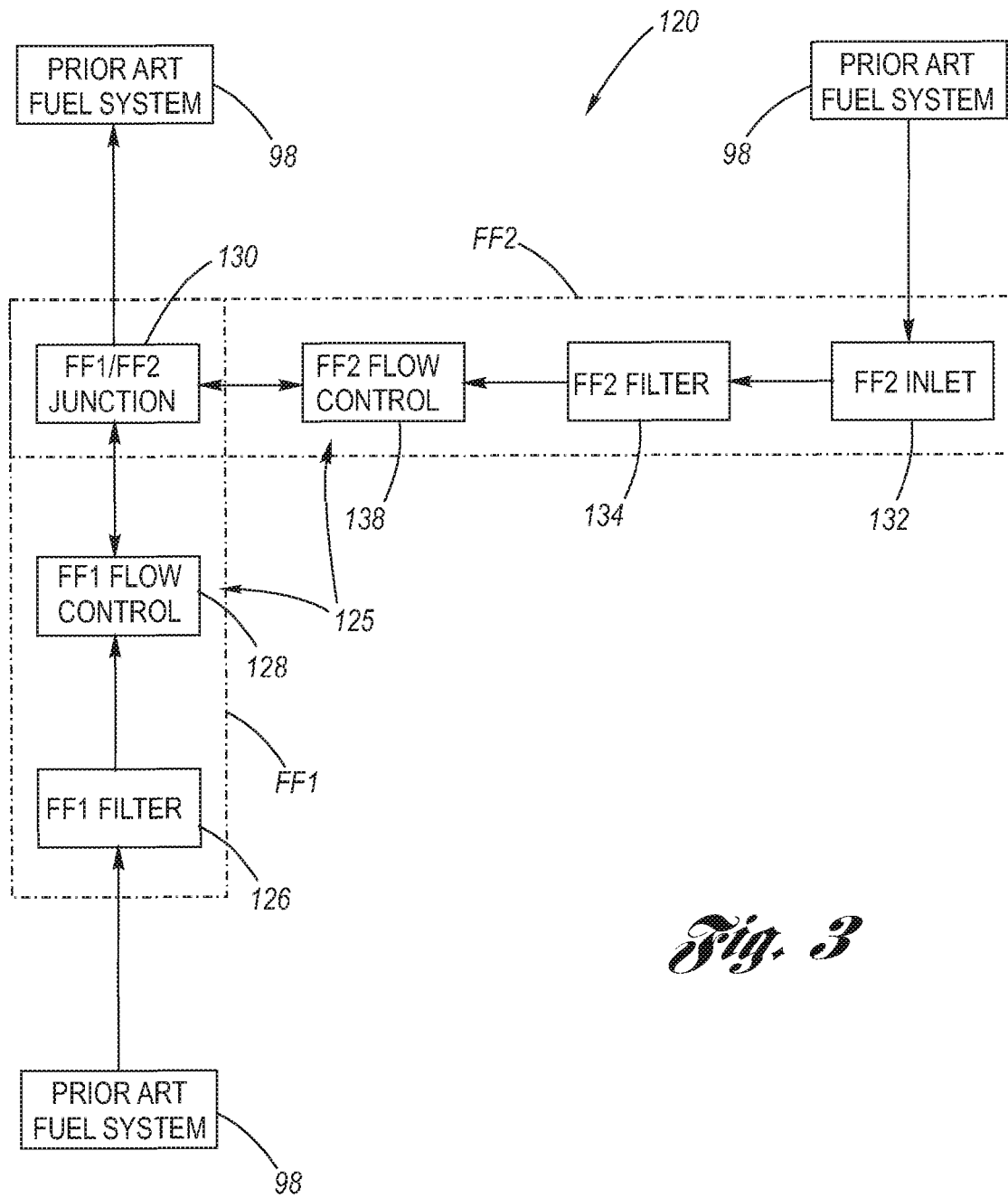
FIG. 3 is a schematic diagram of a generic rendering of the present invention, depicting a first fuel feed line FF1, a second fuel feed line FF2, a junction, and a flow control, all being features generally common to embodiments of the invention extracting native fuel vapor of the fuel tank (that is, excepting in-tank evaporation).

As shown at FIG. 3, the fuel tank temperature and pressure management system 120 includes a first fuel feed line FF1, referred to also herein simply as "FF1"; a second fuel feed line FF2, referred to also herein simply as "FF2". The components which comprise FF1 and FF2 are new components which are added to the prior art fuel system by the present invention; these components include: a junction 130; and a flow control 125. FF1 provides all, or ordinarily predominantly all, liquid fuel (e.g., mostly saturated liquid fuel, but may include some fuel vapor) via a connection to the prior art fuel system 98 which may or may not include a fuel pump. FF1 may include a FF1 flow control 128 and/or a filter 126. FF2 provides all, or predominantly all, fuel vapor (e.g., mostly fuel vapor, but may include some liquid fuel condensate) via an inlet 132 which connects to the prior art fuel system 98. FF2 may also include a FF2 flow control 138 and/or a filter 134. The flow control 125 includes the FF2 flow control 138 (if fitted) and/or the FF1 flow control 128 (if fitted), and may be a single component or multiple components. The junction 130 fluidically connects FF1 to FF2 and fluidically connects FF1 and FF2 to the prior art fuel system 98 down stream of both FF1 and FF2 somewhere prior to the vaporizer-regulator.

Fuel tanks which are used to store fuels at or near their vapor pressure are not filled 100% with liquid fuel. Instead, they are typically fitted with fill-limiting devices which prevent additional fuel from flowing into the fuel tank once the liquid fuel inside the tank reaches a pre-determined level. For example, in the case of LPG, the fill limiting device is usually designed to stop additional fuel from flowing into the tank when the volume of liquid fuel inside the fuel tank is around 80% of the total tank volume. Therefore, even when a LPG fuel tank is 'full' there is a typically volume of vapor above the liquid in the top of the fuel tank, and this vapor space grows in size as fuel is withdrawn from the fuel tank. The FF2 fuel inlet 132 is located in this vapor space above the surface of the liquid fuel in the fuel tank so as to be exposed to native fuel vapor of the prior art fuel system 98, which is at or near its vapor pressure. The flow controls 128, 138 and the junction 130 may be disposed inside the fuel tank, on the wall of the fuel tank or outside the fuel tank, subject to regulatory constraints and/or locational constraints imposed by upstream or downstream hardware of the prior art fuel system. FF2 should be filtered to whichever of the following requirements is more stringent: (1) the degree of filtration required by the FF2 flow control 138; or (2) the degree of filtration required by the FF1 flow control 128 (if fitted); or (3) the degree of filtration required by the prior art fuel system 98 (note: on some prior art fuel systems, an additional fuel filter may be located downstream of the junction 130). It is possible that the FF2 fuel flow stream may be clean enough not to require additional filtering; it is also possible for the filter 134 to serve also as the inlet 132. The FF2 flow control 138 is controlled by one or more fuel pressure signals as inputs, and should be capable of shutting off FF2 when required (e.g., to meet a fuel feed pressure requirement at the junction 130) and provide low resistance to fuel flow when fully open.

The source of liquid fuel to FF1 comes from the prior art fuel system 98 at a location below the surface of the liquid fuel in the fuel tank. This fuel may have already passed through a fuel filter, and/or a fuel pump which, when activated, increases the fuel feed pressure above the fuel tank vapor pressure, and/or a fuel flow control, such as a check valve. FF1 should be filtered to whichever of the following requirements is more stringent: (1) the degree of filtration required by the FF1 fuel flow control 128 (if fitted); or (2) the degree of filtration required by the FF2 fuel flow control 138 (if fitted); or (3) the degree of filtration required by the prior art fuel system 98 (note: if the prior-art fuel system incorporates a fuel filter upstream of this location, then additional filtration of the FF1 flow stream may not be required). The FF1 fuel flow control 128 (if fitted) is controlled by one or more fuel pressure signals as inputs, and should be capable of shutting off FF1 when required (e.g., when tank pressure is high or if there is a risk of fuel vapor flowing backwards into FF1) and should offer low resistance to fuel flow when fully open. It is possible the prior art fuel system may already incorporate a fuel flow control upstream of this location (e.g., a safety solenoid valve), in which case a second fuel flow control at this location may not be required.

The junction 130 is preferably located at a level (height) which is above the surface of the liquid fuel in the fuel tank. If the junction 130 is located level with, or lower than, the surface of the liquid fuel in the fuel tank, then a fuel flow control is required to shut off liquid fuel flow via FF1 (in order, for example, to prevent the junction from being continually flooded with liquid fuel which flows into the junction via FF1). In some circumstances, there may be a small amount of backflow from the junction 130 into either of FF1 and FF2. The ratio of liquid fuel to fuel vapor exiting the junction 130 is controlled by at least one of the prior art fuel pump (if fitted) and/or the FF2 flow control 138 (if fitted), and/or the FF1 flow control 128 (if fitted).

It is to be understood with respect to operation of the fuel tank temperature and pressure management system according to the present invention, that operational components, for example the FF1 flow control (if fitted), the FF2 flow control (if fitted), the junction, and a fuel pump (if fitted), are operated in mutual synchronicity so that operational conflict is avoided.

Figure 4:
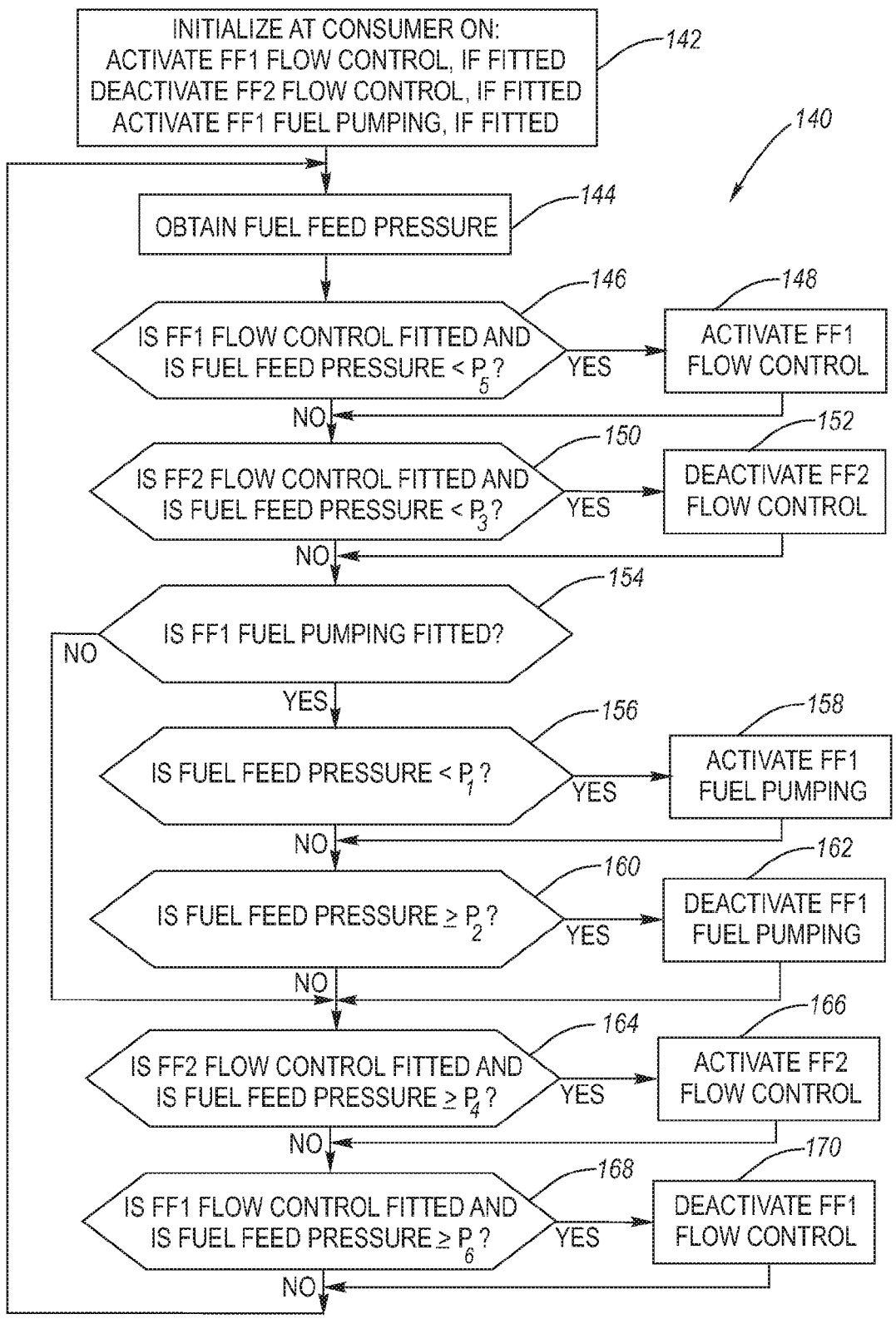
FIG. 4 is an exemplar operational algorithm for the fuel tank temperature and pressure management system according to the present invention as shown generally at FIG. 3.
Figure 5A:
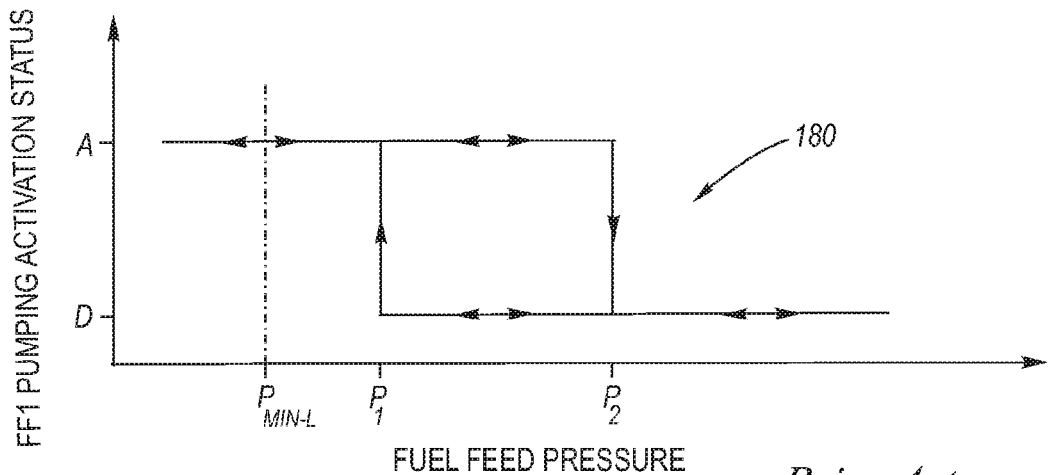
FIGS. 5A through 5C are schematic diagrams of hysteresis loops implementation of the algorithm of FIG. 4, depicting the activation status, respectively, for (prior art) FF1 pumping, FF1 flow control, and FF2 flow control, each as a function of fuel feed pressure.
Figure 5B:
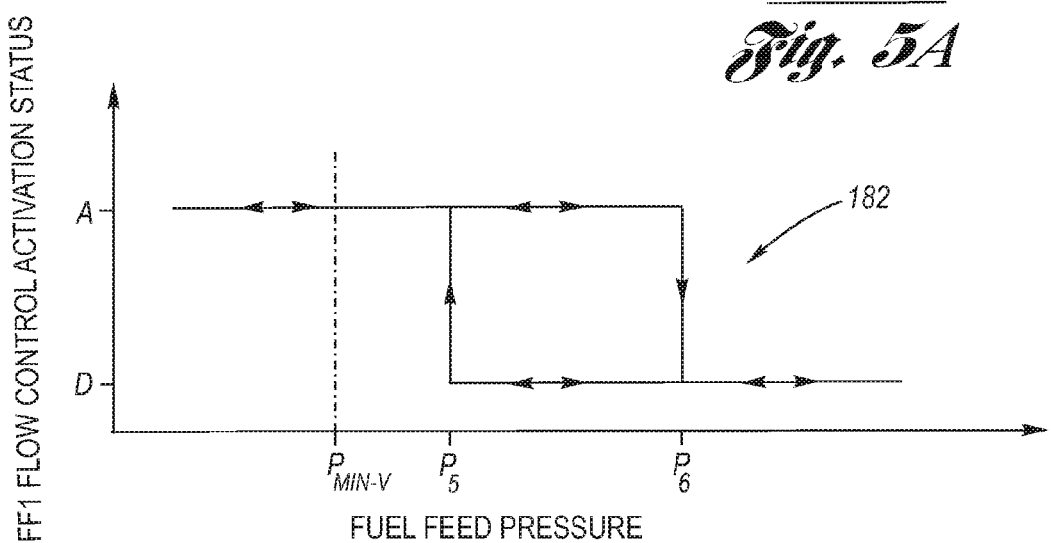
Figure 5C:
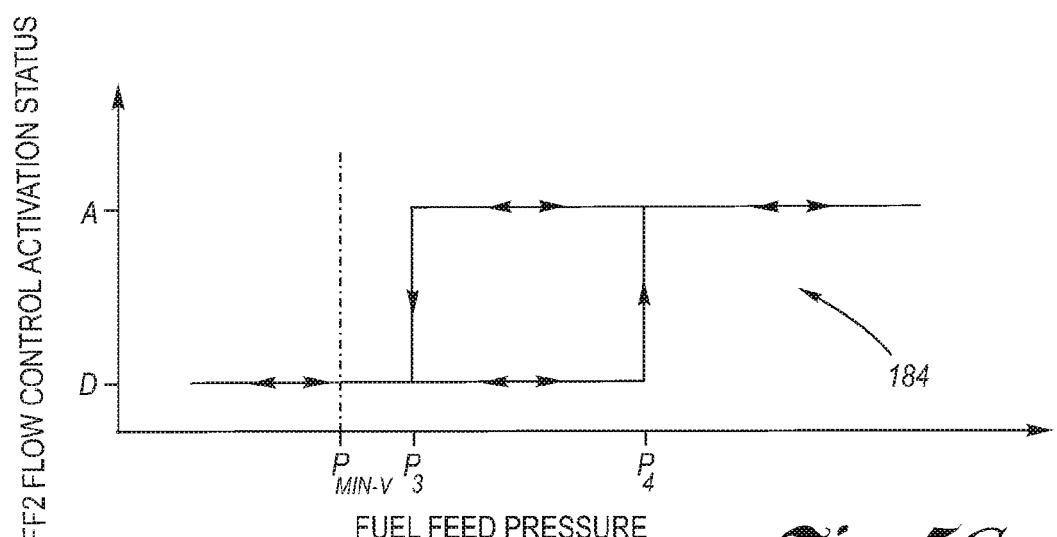

FIG. 4 depicts an exemplar algorithm for implementing the fuel tank temperature and pressure management system 120 depicted at FIG. 3, which is to be considered in conjunction with FIGS. 5A through 5C, which are schematic diagrams of hysteresis loops implementing the algorithm of FIG. 4, and depict the activation status, respectively, for (prior art) FF1 pumping, FF1 flow control, and FF2 flow control, each as a function of fuel feed pressure.

In FIGS. 5A through 5C, threshold pressures $P_1$, $P_2$, $P_3$, $P_4$, $P_5$, $P_6$, $P_{MIN-L}$ and $P_{MIN-V}$ are preselected values. $P_{MIN-L}$ and $P_{MIN-V}$ are selected to ensure that the fuel feed pressure meets the minimum fuel feed pressure requirement at the vaporizer-regulator with 100% saturated liquid fuel feed and 100% gaseous fuel feed, respectively; they may be constants, selected so that the fuel feed pressure is adequate over the full range of anticipated operating conditions, or variables which can increase or decrease on the basis of inputs such as the instantaneous fuel flow rate, the density of fuel in the fuel tank, etc. In the hysteresis loop 180 of FIG. 5A, for stable operation, the pressure difference between $P_1$ and $P_2$ should be greater than fuel feed pressure increase experienced at the vaporizer-regulator when FF1 fuel pumping is activated. In the hysteresis loop 182 of FIG. 5B, for stable operation, the pressure difference between $P_5$ and $P_6$ should be greater than fuel feed pressure reduction experienced at the vaporizer-regulator when switching from liquid fuel feed to fuel vapor feed. In the hysteresis loop 184 of FIG. 5C, for stable operation, the pressure difference between $P_3$ and $P_4$ should be greater than fuel feed pressure reduction experienced at the vaporizer-regulator when switching from liquid fuel feed to fuel vapor feed. Merely by way of example and not limitation, $P_1$ could equal 3.5 bar, $P_2$ could equal 6.5 bar, $P_3$ could equal 4 bar, $P_4$ could equal 8 bar, $P_5$ could equal 4 bar, $P_6$ could equal 8 bar, $P_{MIN-L}$ could equal 3.5 bar, and $P_{MIN-V}$ could equal 4 bar.

In FIG. 4, the algorithm begins at Box 142, whereat conditions of the system are set to initialization values upon the fuel consumer being switched on, wherein FF1 flow control 128 is activated (if fitted in the system), FF2 flow control 138 is deactivated (if fitted in the system), and FF1 fuel pumping is initiated via the prior art fuel system 98 (if fitted in the system). Herein, a 'normally-off'/'normally closed' convention is assumed, wherein the term "activate" means to turn on, to open completely or to open partly, and the term "deactivate" means to turn off or to close. This convention is adopted to succinctly and unambiguously describe the state of the fuel pump and any valves fitted to the fuel system. It is not intended that the preference for 'normally-open' versus 'normally-closed' valves be documented by using this convention. Whether a 'normally-open' or 'normally-closed' valve is used will depend on functionality requirements (including fail-safe requirements) and cost. Low-cost, 'off-the-shelf' solenoid valves which are suitable for use with LPG fuel are typically 'normally-closed', however if a solenoid valve is fitted as part of the FF1 flow control, then on some embodiments it may be desirable for this valve to be 'normally open' as this type of valve will revert to the same functionality as a prior art fuel system, in the event of an 'open circuit'.

The algorithm then advances to Block 144, whereat data is obtained by sensors, calculated and/or obtained from a look-up table. This typically will include the fuel feed pressure, preferably just upstream of the vaporizer-regulator of the prior art fuel system 98. The algorithm then advances to Decision Block 146.

At Decision Block 146, inquiry is made as to whether or not the fuel feed pressure is less than $P_5$, provided the FF1 flow control is present in the system. If the answer to the inquiry is yes, then the algorithm proceeds to Block 148, whereat the FF1 flow control 128 is activated, and the algorithm then proceeds to Decision Block 150; otherwise, if the answer to the inquiry at Decision Block 146 was no, then the algorithm proceeds directly to Decision Block 150.

At Decision Block 150, inquiry is made as to whether or not the fuel feed pressure is less than $P_3$, provided the FF2 flow control is present in the system. If the answer to the inquiry is yes, then the algorithm proceeds to Block 152, whereat the FF2 flow control 138 is deactivated, and the algorithm then proceeds to Decision Block 154; otherwise, if the answer to the inquiry at Decision Block 150 was no, then the algorithm proceeds directly to Decision Block 154.

At Decision Block 154, inquiry is made as to whether or not the prior art fuel system includes a fuel pump, wherein if the answer to the inquiry is no, then the algorithm advances to Decision Block 164; otherwise if the answer to the inquiry at Decision Block 154 was yes, then the algorithm advances to Decision block 156.

At Decision Block 156, inquiry is made as to whether or not the fuel feed pressure is less than $P_1$. If the answer to the inquiry is yes, then the algorithm proceeds to Block 158, whereat the FF1 fuel pumping is activated, and the algorithm then proceeds to Decision Block 160; otherwise, if the answer to the inquiry at Decision Block 156 was no, then the algorithm proceeds directly to Decision Block 160.

At Decision Block 160, inquiry is made as to whether or not the fuel feed pressure is greater than or equal to $P_2$. If the answer to the inquiry is yes, then the algorithm proceeds to Block 162, whereat the FF1 fuel pumping is deactivated, and the algorithm then proceeds to Decision Block 164; otherwise, if the answer to the inquiry at Decision Block 160 was no, then the algorithm proceeds directly to Decision Block 164.

At Decision Block 164, inquiry is made as to whether or not the fuel feed pressure is greater than or equal to $P_4$, provided the FF2 flow control is present in the system. If the answer to the inquiry is yes, then the algorithm proceeds to Block 166, whereat the FF2 flow control 138 is activated, and the algorithm then proceeds to Decision Block 168; otherwise, if the answer to the inquiry at Decision Block 164 was no, then the algorithm proceeds directly to Decision Block 168.

At Decision Block 168, inquiry is made as to whether or not the fuel feed pressure is greater than or equal to $P_6$, provided the FF1 flow control is present in the system. If the answer to the inquiry is yes, then the algorithm proceeds to Block 170, whereat the FF1 flow control 128 is deactivated, and the algorithm then returns to Block 144; otherwise, if the answer to the inquiry at Decision Block 168 was no, then the algorithm proceeds directly to Block 144.

Turning attention now to FIGS. 6A through 7B, structural and functional examples of implementations of the fuel tank temperature and pressure management system of FIG. 3 will be detailed.

Figure 6A:
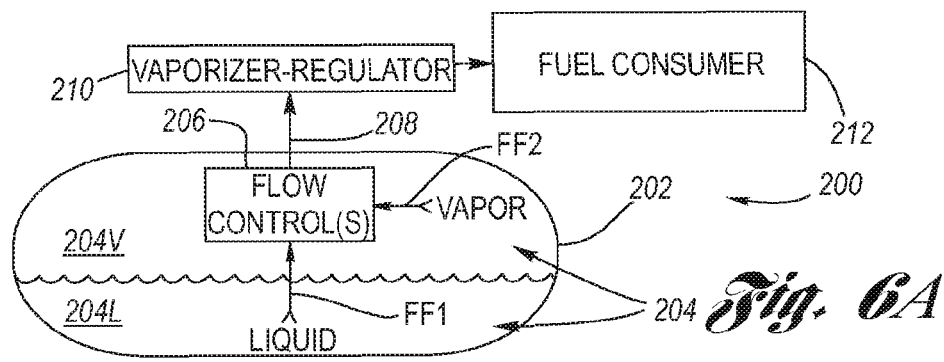
FIG. 6A is a schematic diagram of a first example of a fuel tank temperature and pressure management system for supplying fuel via a vaporizer-regulator to a fuel consumer according to the present invention.

At FIG. 6A is depicted a first schematic apparatus diagram 200 of implementation of the fuel tank temperature and pressure management system 120 of FIG. 3. A fuel tank 202 contains a fuel 204 at or near its vapor pressure, including liquid fuel 204L and fuel vapor 204V constituent components. Liquid fuel 204L is (predominantly) delivered via FF1 and fuel vapor 204V is (predominantly) delivered via FF2 to flow control(s) 206, wherein the flow control(s) may incorporate a single flow control or multiple flow control components associated with either or both of FF1 and FF2. The fuel from the flow control(s) 206 is delivered to a vaporizer-regulator 210 via a fuel line 208, whereupon thereafter the fuel under normal operating conditions is entirely gaseous and is thereupon delivered to a fuel consumer 212.

Figure 6B:
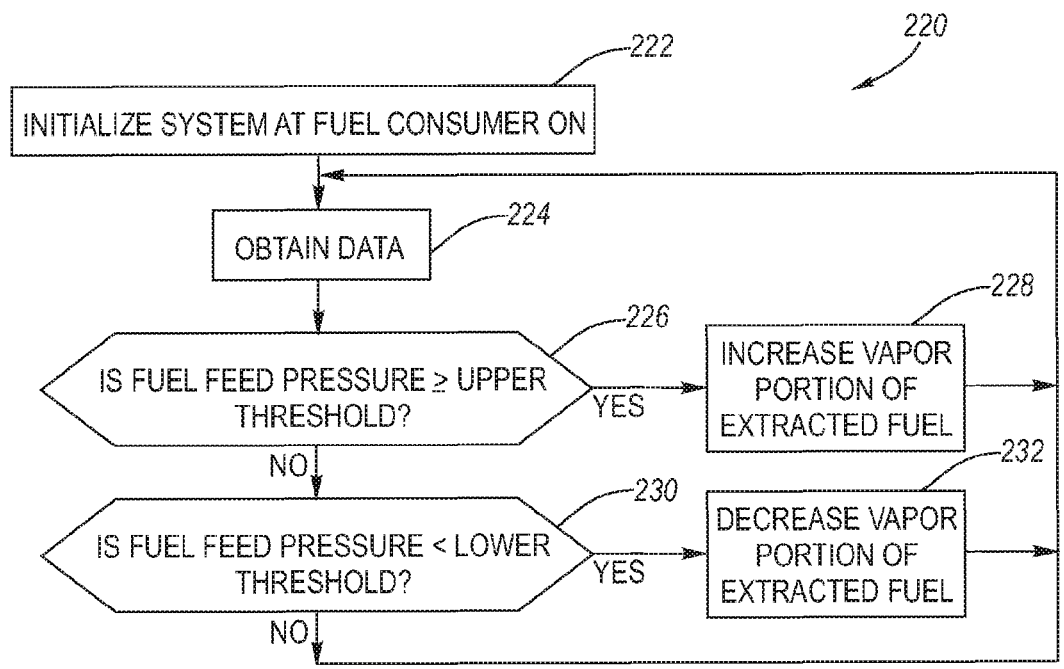
FIG. 6B is an exemplar operational algorithm for the system of FIG. 6A.

FIG. 6B is an example of an algorithm 220 for carrying out operation of the schematic apparatus diagram 200 of FIG. 6A.

The system is initialized at Block 222 when the fuel consumer is switched on. Initialization values upon the fuel consumer being switched on may include the flow control(s) delivering fuel via FF1 and not via FF2, or may include fuel being delivered via FF2 and not via FF1, or may include fuel being delivered by both FF1 and FF2 in a predetermined relative proportionality. Next, at Block 224 data is obtained, as for example by sensing, calculating, and/or a look-up table, wherein the data includes fuel feed pressure taken anywhere between the inside of the fuel tank and the fuel consumer, preferably just upstream of the vaporizer-regulator 210. The algorithm then advances to Decision Block 226, whereat inquiry is made as to whether or not fuel feed pressure is greater than or equal to a determined upper threshold fuel pressure. If the answer to the inquiry at Decision block 226 is yes, then the algorithm advances to Block 228, whereat the flow control(s) 206 is adjusted to proportionally increase fuel delivery via FF2 as compared to fuel delivery via FF1, and the algorithm then returns to Block 224. However, if the answer to the inquiry at Decision Block 226 is no, then the algorithm advances to Decision Block 230.

At Decision Block 230, inquiry is made as to whether or not the fuel feed pressure is less than the determined lower threshold fuel pressure. If the answer to the inquiry at Decision block 230 is yes, then the algorithm advances to Block 232, whereat the flow control(s) 206 is adjusted to proportionally decrease fuel delivery via FF2 as compared to fuel delivery via FF1, and the algorithm then returns to Block 224. However, if the answer to the inquiry at Decision Block 230 is no, then the algorithm advances to Block 224.

The determined upper threshold fuel pressure and the determined lower threshold fuel pressure may be constants, selected so that the fuel feed pressure is adequate over the full range of anticipated operating conditions, or are variables which can increase or decrease on the basis of inputs such as the instantaneous fuel flow rate, the density of fuel in the fuel tank, etc., wherein the determined upper threshold fuel pressure is greater than or equal to the determined lower threshold fuel pressure. The determined upper threshold fuel pressure should lie above the range of fuel feed pressures over which the FF1 fuel pump (if fitted) is activated. Fuel feed pressure may be measured or calculated at one or more convenient locations between the fuel tank (including locations inside the fuel tank) and the fuel consumer. In cases where a fuel pressure regulator is fitted to control the pressure of the fuel at the fuel consumer, then for the purposes of this control loop, fuel feed pressure should preferably be measured or calculated at at least one location upstream of this pressure regulator (inclusive of a location or locations which may lie inside the fuel tank).

Figure 7A:
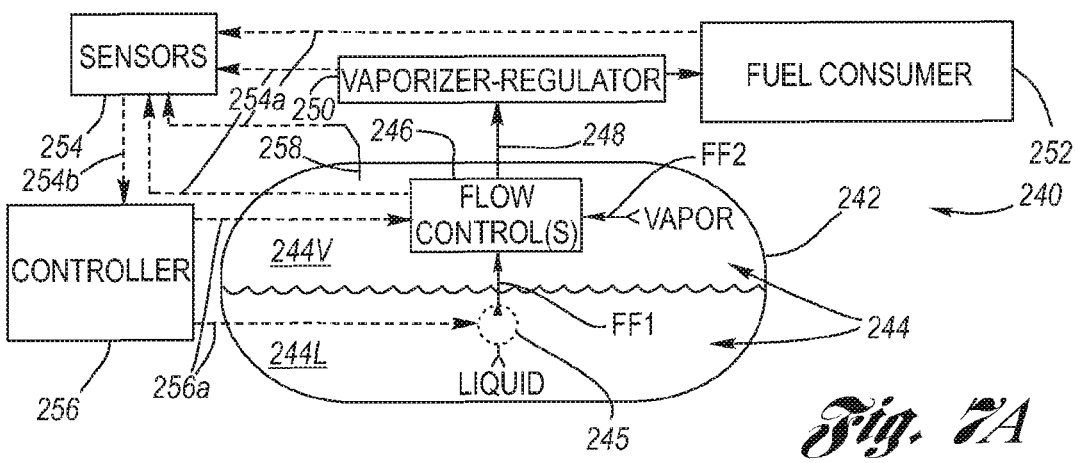
FIG. 7A is a schematic diagram of a second example of a fuel tank temperature and pressure management system for supplying fuel via a vaporizer-regulator to a fuel consumer according to the present invention.

At FIG. 7A is depicted a second schematic apparatus diagram 240 of implementation of the fuel tank temperature and pressure management system 120 of FIG. 3. A fuel tank 242 contains a fuel 244 at or near its vapor pressure, including liquid fuel 244L and fuel vapor 244V constituent components. Liquid fuel 244L is (predominantly) delivered via FF1, wherein a prior art fuel system optionally includes a fuel pump 245, and fuel vapor 244V is (predominantly) delivered via FF2 to a flow control(s) 246, wherein the flow control(s) may incorporate a single flow control or multiple flow control components associated with either or both of FF1 and FF2. The fuel from the flow control(s) 246 is delivered to a vaporizer-regulator 250 via a fuel line 248, whereupon thereafter the fuel is entirely gaseous and is thereupon delivered to a fuel consumer 252. Additionally, sensors 254 detect data, as for example via data line(s) 254a, including fuel feed pressure upstream of the vaporizer-regulator 250, and also optionally including fuel demand of the consumer 252, fuel pressure/temperature of the fuel 244 in the fuel tank, and state status of the flow control(s) 246. This data is utilized, via a data line 254b, by a controller 256, as for example a programmed ECM, which outputs control of the flow control(s) 246 and the fuel pump (if fitted) via a control line(s) 256a.

Figure 7B:
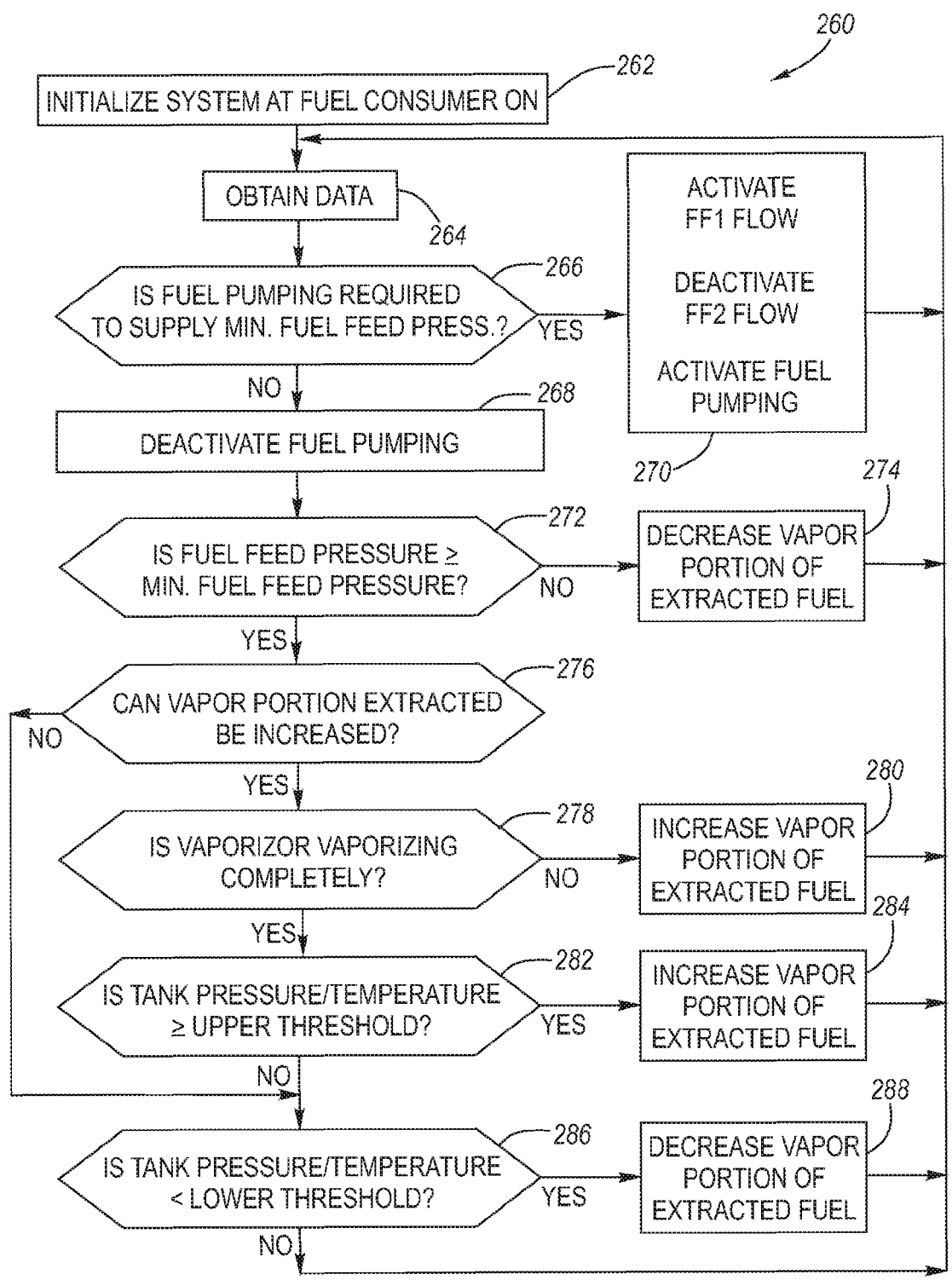
FIG. 7B is an exemplar operational algorithm for the system of FIG. 7A.

FIG. 7B is an example of an algorithm 260 for carrying out operation of the schematic apparatus diagram 240 of FIG. 7A.

The system is initialized at Block 262 when the fuel consumer is switch on. Initialization values upon the fuel consumer being switched on may include the flow control(s) delivering fuel via FF1 and not via FF2, or may include fuel being delivered via FF2 and not via FF1, or may include fuel being delivered by both FF1 and FF2 in a predetermined relative proportionality. Next, at Block 264 data is obtained, as for example by sensing, calculating, and/or using a look-up table, wherein the data includes fuel feed pressure, preferably just upstream of the vaporizer-regulator 250, which is indicative of fuel demand of the consumer 252, and may optionally include fuel pressure/temperature of the fuel 244 in the fuel tank, and state status of the flow control(s) 246. Data is obtained anywhere from inside the fuel tank to the fuel consumer.

The algorithm then advances to Decision Block 266, whereat inquiry is made as to whether or not fuel pumping is required in order to supply minimal fuel feed pressure at the vaporizer-regulator 250 in order to supply the fuel demand of the fuel consumer 252. If the answer to the inquiry at Decision Block 266 is yes, then the algorithm advances to Block 270, whereat the flow control(s) 206 is adjusted to enable fuel flow via FF1 by activating the FF1 flow control and disabling fuel flow via FF2 by deactivating the FF2 flow control, and pumping by the fuel pump 245 is activated (wherein, a normally closed valve convention is adopted for the description, where the term "activate" means to turn on, to open completely or to open partly, and the term "deactivate" means to turn off or to close), and the algorithm then returns to Block 264. However, if the answer to the inquiry at Decision Block 266 is no, then the algorithm advances to Block 268, whereat pumping is stopped, or remains stopped if already stopped, and then advances to Decision Block 272.

At Decision Block 272, inquiry is made as to whether or not the fuel feed pressure is greater than or equal to a determined minimum fuel feed pressure at the vaporizer-regulator 250, as for example the pressure necessary in order to adequately supply the fuel demand of the fuel consumer 252 (which may include anticipation of future demand). If the answer to the inquiry at Decision Block 272 is no, then the algorithm advances to Block 274, whereat the flow control(s) 246 is adjusted to proportionally decrease fuel delivery via FF2 as compared to fuel delivery via FF1, and the algorithm then returns to Block 264. However, if the answer to the inquiry at Decision Block 272 is no, then the algorithm advances to Decision Block 276.

At Decision Block 276, inquiry is made as to whether or not additional fuel vapor 244V can be extracted from the fuel tank 242 while still meeting the minimum fuel feed pressure at the vaporizer-regulator 250. If the answer to the inquiry at Decision Block 272 is no, then the algorithm advances to Decision Block 286. However, if the answer to the inquiry at Decision Block 276 is yes, then the algorithm advances to Decision Block 278.

At Decision Block 278, inquiry is made as to whether or not the vaporizer of the vaporizer-regulator 250 is completely vaporizing the fuel being delivered thereto. If the answer to the inquiry at Decision Block 278 is no, then the algorithm advances to Block 280, whereat the flow control(s) 246 is adjusted to proportionally increase fuel delivery via FF2 as compared to fuel delivery via FF1, and the algorithm then returns to Block 264. However, if the answer to the inquiry at Decision Block 278 is yes, then the algorithm advances to Decision Block 282.

At Decision Block 282, inquiry is made as to whether or not the in tank fuel pressure/temperature is greater than or equal to an upper threshold value. The upper threshold value may be, for example, that value in which the fuel pressure in the tank provides fuel adequately for the fuel demand of the fuel consumer. If the answer to the inquiry at Decision Block 282 is yes, then the algorithm advances to Block 284, whereat the flow control(s) 206 is adjusted to proportionally increase fuel delivery via FF2 as compared to the fuel delivery via FF1, and the algorithm returns to Block 264. However, if the answer to the inquiry at Decision Block 282 is no, then the algorithm advances to Decision Block 286.

At Decision Block 286, inquiry is made as to whether or not the in tank fuel pressure/temperature is less than a lower threshold value. The lower threshold value may be, for example, that value in which the fuel pressure in the tank does not provide fuel adequately for the fuel demand of the fuel consumer and/or excessive water condensate or ice forms on external surfaces of the fuel system. If the answer to the inquiry at Decision Block 286 is yes, then the algorithm advances to Block 288, whereat the flow control(s) 246 is adjusted to proportionally decrease fuel delivery via FF2 as compared to the fuel delivery via FF1, and the algorithm returns to Block 264. However, if the answer to the inquiry at Decision Block 286 is no, then the algorithm returns to Block 264.

Turning attention now to FIGS. 8 through 12, exemplar apparatus embodiments for implementing the fuel tank temperature and pressure management system of FIG. 3 will be detailed.

As a preface thereto, Table 1 exemplifies the relationship between hardware elements, control variables of the hardware elements, and resulting control states. The present invention provides control states "X", which are not provided in prior art fuel systems (e.g., FIGS. 1A through 1C). However, prior art fuel systems are capable of operating in one or more of control states "$PA_1$"; and when the FF1 fuel flow control and the FF2 fuel flow control are deactivated or are not fitted, then the present invention operates similarly to a prior art fuel system with control states identified as Turning attention firstly to FIG. 8, a first exemplar embodiment 300 is depicted of the fuel tank temperature and pressure management system according to the present invention, in which control states CS1, CS2 and CS7 of Table 1 are applicable thereto.

In this LPG fuel system first embodiment 300, LPG fuel 304 in the top of the fuel tank 302 is a saturated fuel vapor (or simply, a vapor) 304V, and therebelow is disposed liquid fuel 304L, wherein the fuel may be any fuel stored at or near its vapor pressure, and need not be LPG.

The fuel tank 302 is equipped with a pressure relief valve, and may be equipped with a temperature sensor and a pressure sensor, not shown, but each component having been described in detail hereinabove; and the contents of the fuel tank may be subjected to various heats (not shown) as also described in detail hereinabove.

Contained within the fuel tank 302 are components of a prior art fuel system 306, namely a filter 308, a fuel pump 310, a check valve 312, a filter 314 and a fuel pressure regulator 316, all of which were detailed hereinabove, as for example per the discussion of FIG. 1A. The operation of the fuel pump may be responsive to the fuel pressure regulator 316, to another source of pressure differential, or to the command of a controller. External to the fuel tank 302 are additional components of the prior art fuel system, as also discussed in detail hereinabove, namely: a valve set 318 typically including a flow control valve 320, a service valve 322, and an automatic fuel shut-off solenoid valve 324, and further downstream are

TABLE 1

| Hardware Element | Control Variables | | Control States | | | | | | | | |
|---|---|---|---|---|---|---|---|---|---|---|---|
| | | | CS1 | CS2 | CS3 | CS4 | CS5 | CS6 | CS7 | CS8 | CS9 |
| FF1 Liquid Fuel Pumping | Maximum Feed Pressure Increase | e.g., 100% PWM | $PA_1$ | | | | | | | | |
| | Modulate Fuel Feed Pressure Increase | e.g., 0% to 100% PWM | | $PA_1$ | | | | | | | |
| | No Fuel Feed Pressure Increase | Hardware element deactivated or not fitted | | | | $PA_1$ | X | X | X | X | X | X |
| FF1 Liquid Fuel Flow Control | Minimum Fuel Flow Restriction | Hardware element fully open or not fitted | $PA_2$ | $PA_2$ | $PA_2$ | X | | | X | | |
| | Modulate Fuel Flow Restriction | Hardware element partially open | | | | | X | | | X | |
| | Maximum Fuel Flow Restriction | Hardware element fully closed | | | | | | X | | | X |
| FF2 Gaseous Control | Minimum Fuel Flow Restriction | Hardware element fully open | | | | | | | X | X | X |
| | Modulate Fuel Flow Restriction | Hardware element partially open | | | | X | X | X | | | |
| | Maximum Fuel Flow Restriction | Hardware element fully closed or not fitted | $PA_2$ | $PA_2$ | $PA_2$ | | | | | | | another automatic fuel shut off solenoid valve 326, a vaporizer-regulator 328 and a fuel consumer 330.

In accordance with the first embodiment 300 of the present invention, provided additionally over the prior art fuel system components, are: a filter 332 disposed in an upper location of the fuel tank, whereby fuel vapor 304V enters thereinto via an inlet; and a check valve 334 which is connected to the filter 332. The check valve 334 connects, via a junction 336, with the prior art fuel system 306 downstream of the fuel pump 310 and its check valve 312, and upstream of the filter 314. By comparison with FIG. 3, it will be noticed that FF2 is constituted by the junction 336, the check valve 334, the filter 332 and the pipework which connects these components, and that FF1 is generally constituted by the junction 336, wherein FF1 and FF2 are also mutually joined to the downstream prior art fuel system at the junction 336.

In operation, the check valves 312 and 334 provide low resistance to fuel which flows from the fuel tank towards junction 336 and high resistance to fuel which flows from junction 336 to the fuel tank via FF1 and FF2 respectively. Under at least some operating conditions, including operating conditions when the fuel pump is not on (that is, it is not pumping liquid fuel), the flow resistance to fuel flowing from the fuel tank to junction 336 via FF2 shall be less than the resistance to fuel flowing from the fuel tank to junction 336 via FF1. In such cases, fuel vapor 304V is extracted from the fuel tank 302 via FF2 and delivered to the vaporizer-regulator 328. However, whenever the fuel pump is on (that is, it is pumping liquid fuel), then the check valve 334 is closed, by the pressure of liquid fuel flowing to junction 336 via FF1, such that liquid fuel 304L is delivered via FF1 to the vaporizer-regulator 328, while fuel vapor 304V via FF2 is shut off.

It is desired that the height of the junction 336 be selected so that when fuel vapor flows through FF1 it is not obstructed, impeded or otherwise adversely affected by liquid fuel; this is accomplished by selecting, per the principles of hydrostatics and fluid dynamics, the requisite height of junction 336 above the surface of the liquid fuel 304L in the fuel tank.

Given a fuel pump that is PWM (pulse width modulation) controlled (which is often the case for prior art LPG fuel systems), then it may be possible to exert control over the flow rate of fuel which reaches junction 336 via FF1, thus altering the ratio of: mass flow of liquid fuel to mass flow of fuel vapor simply by altering the PWM drive to the fuel pump.

A suitable check valve 334 is for example a Series 832 or 855 Lee IMH 8 mm check valve, manufactured by The Lee Company, Industrial Microhydraulics Division, Westbrook, Conn.

The first embodiment is preferred for its simplicity. It should be noted that in the event that check valve 334 fails closed, then the system reverts to the functionality of the prior art fuel system of FIG. 1A. If however check valve 335 fails open, then this could be problematic from the standpoint of liquid fuel delivery via FF1; to reduce the risk of this failure mode, two or more check valves 334 can be fitted in series if required.

Figure 8:
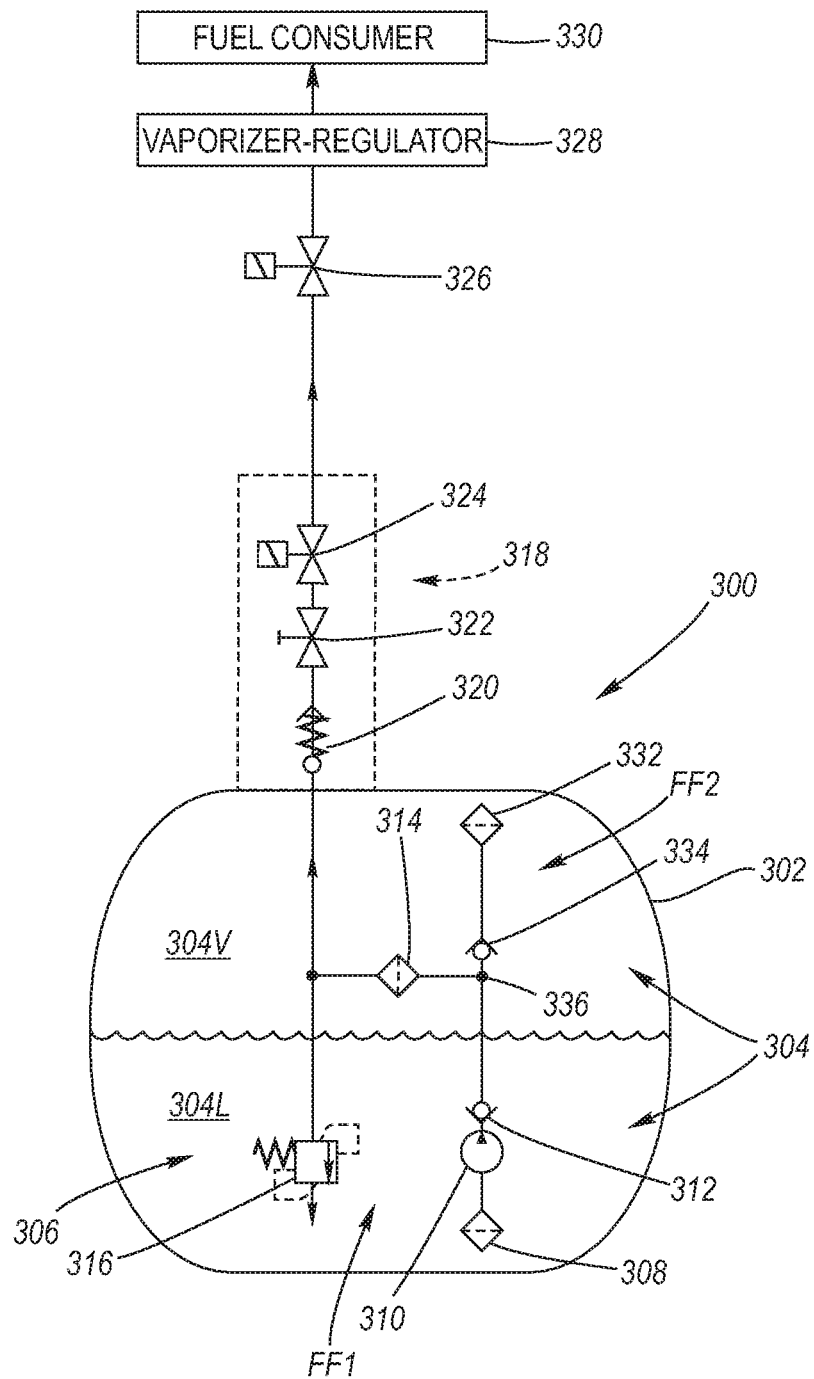
FIG. 8 is a schematic diagram of a gaseous-phase fuel system equipped with a first, preferred, example of the fuel tank temperature and pressure management system according to the present invention.
Figure 9:
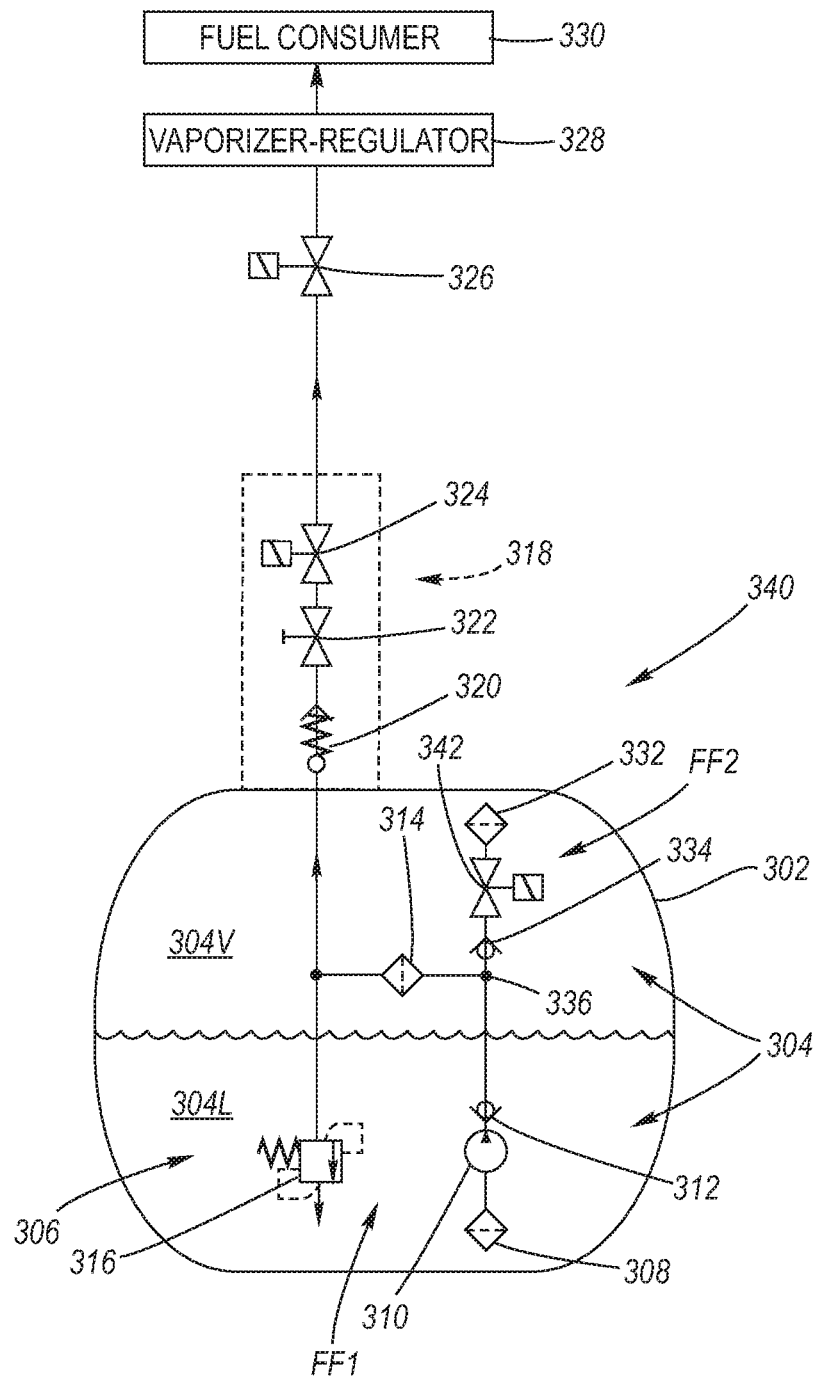
FIG. 9 is a schematic diagram of a gaseous-phase fuel system equipped with a second example of the fuel tank temperature and pressure management system according to the present invention.

Turning attention now to FIG. 9, a second exemplar embodiment 340 is depicted of the fuel tank temperature and pressure management system according to the present invention, which is a variant of the first embodiment 300 to now have applicability thereto of control states CS1 through CS4, inclusive, and CS7 of Table 1 (two additional control states (CS3 and CS4) relative to the first embodiment), wherein numerals identical to FIG. 8 will be used to designated identical components.

In this LPG fuel system second embodiment 340, LPG fuel 304 in the top of the fuel tank 302 is a saturated fuel vapor (or simply, a vapor) 304V, and therebelow is disposed liquid fuel 304L, wherein the fuel may be any fuel stored at or near its vapor pressure, and need not be LPG.

The fuel tank 302 is equipped with a pressure relief valve, and may be equipped with a temperature sensor and a pressure sensor, not shown, but each component having been described in detail hereinabove; and the contents of the fuel tank may be subjected to various heats (not shown) as also described in detail hereinabove.

Contained within the fuel tank 302 are components of a prior art fuel system 306, namely a filter 308, a fuel pump 310, a check valve 312, a filter 314 and a fuel pressure regulator 316, all of which were detailed hereinabove, as for example per the discussion of FIG. 1A. The operation of the fuel pump may be responsive to the fuel pressure regulator 316, to another source of pressure differential, or to the command of a controller. External to the fuel tank 302 are additional components of the prior art fuel system, as also discussed in detail hereinabove, namely: a valve set 318 typically including a flow control valve 320, a service valve 322, and an automatic fuel shut-off solenoid valve 324, and further downstream are another automatic fuel shut off solenoid valve 326, a vaporizer-regulator 328 and a fuel consumer 330.

In accordance with the second embodiment 340 of the present invention, provided additionally over the prior art fuel system components, are: a filter 332 disposed in an upper location of the fuel tank, whereby fuel vapor 304V enters thereinto at an inlet; a check valve 334 and a two-way solenoid valve 342 disposed between the check valve 334 and the filter 332. The check valve 334 connects, via a junction 336, to the prior art fuel system 306 downstream of the fuel pump 310 and its check valve 312, and upstream of the filter 314. By comparison with FIG. 3, it will be noticed that FF2 is constituted by junction 336, the check valve 334, the filter 332, the two-way solenoid valve 342 and the pipework which connects these components, and that FF1 is generally constituted by the junction 336, wherein FF1 and FF2 are also mutually joined to the downstream prior art fuel system at the junction 336.

The two-way solenoid valve 342 may be on-off, or proportional, as for example controlled by pulse width modulation (PWM) in a manner known in the art, and is controlled via a controller (not shown), as for example controller 256 of FIG. 7A.

In operation, the two-way solenoid valve 342 may be closed, partly opened or fully opened. Given an open state of the two-way solenoid valve 342, then the system functions in the same way as the embodiment depicted in FIG. 8. Additionally, whenever the two-way solenoid valve 342 is closed, so is FF2 closed, whereby independent of the state of operation of the fuel pump 310 or a failure of the check valve 334, liquid fuel 304L is delivered to the vaporizer-regulator 328 via FF1.

Key advantages of the second embodiment relative to the first embodiment include: 1) the second embodiment facilitates the flow of liquid fuel to the fuel consumer via FF2 without having to turn the fuel pump on; 2) if fitted with a proportional two-way solenoid valve, the second embodiment offers a means of feeding fuel to the fuel consumer via FF1 and FF2 simultaneously, while controlling the proportion of fuel supplied by each fuel feed, without having to turn the fuel pump on; 3) the combination of check valve 334 and two-way solenoid valve 342 introduces fail-safe redundancy in that undesirable reverse flow from the junction 336 to the fuel tank via FF2 can be prevented, even if one of the check valve 334 or two-way solenoid valve 342 fails open.

The two-way solenoid valve 342 is preferably a normally-closed valve. A suitable two-way solenoid valve 342 is an L240 Propane Fuel Lock-off available through Impco Technologies of Santa Ana, Calif. 92704.

Figure 10:
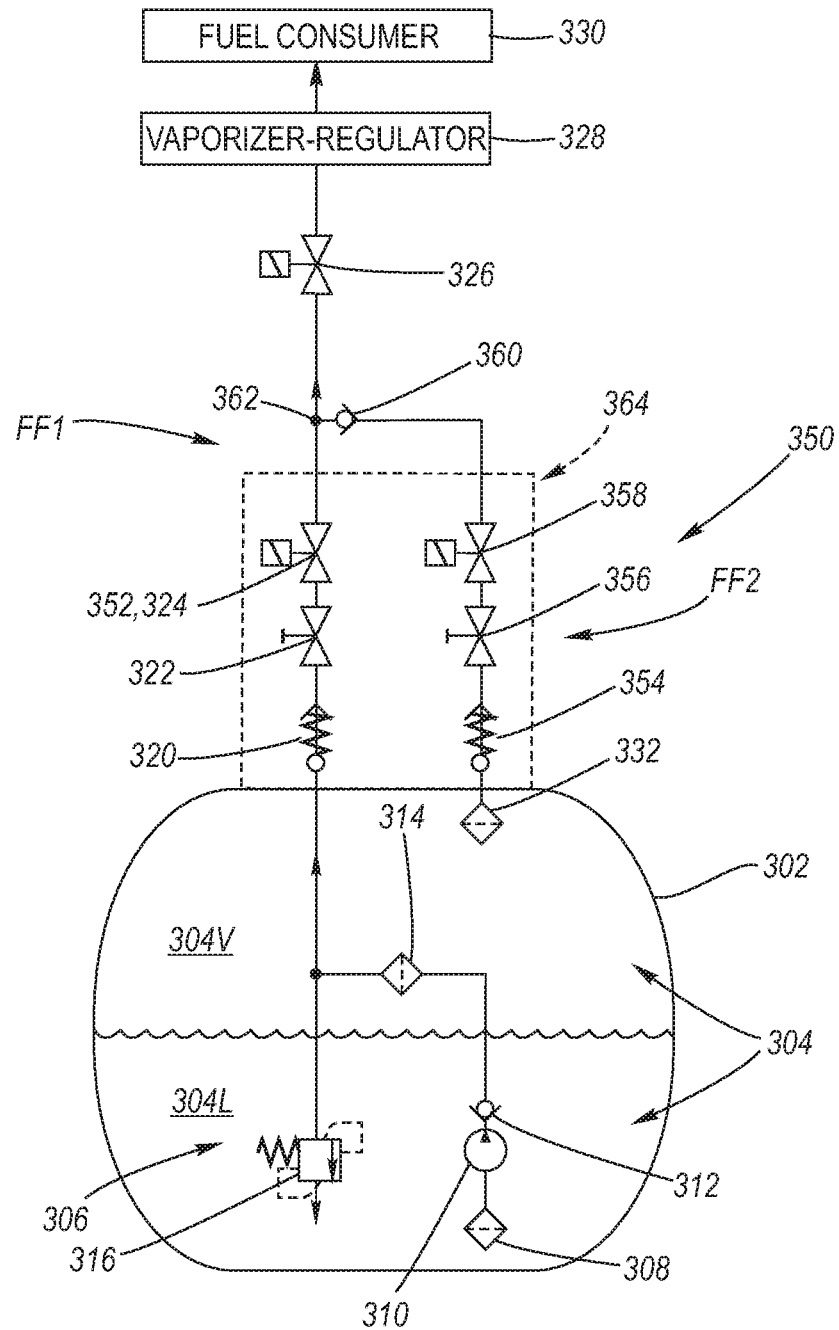
FIG. 10 is a schematic diagram of a gaseous-phase fuel system equipped with a third, also preferred, example of the fuel tank temperature and pressure management system according to the present invention.

Turning attention next to FIG. 10, a third exemplar embodiment 350, which is also preferred due to its broad functionality, is depicted of the fuel tank temperature and pressure management system according to the present invention, wherein now there is applicability thereto of all the control states of Table 1, that is, all control states CS1 through CS9, inclusive (four additional control states (CS5, CS6, CS8 and CS9) relative to the second embodiment), and wherein numerals identical to FIG. 8 will be used to designate identical components.

In this LPG fuel system third embodiment 350, LPG fuel 304 in the top of the fuel tank 302 is a saturated fuel vapor (or simply, a vapor) 304V, and therebelow is disposed liquid fuel 304L, wherein the fuel may be any fuel stored at or near its vapor pressure, and need not be LPG.

The fuel tank 302 is equipped with a pressure relief valve, and may be equipped with a temperature sensor and a pressure sensor, not shown, but each component having been described in detail hereinabove; and the contents of the fuel tank may be subjected to various heats (not shown) as also described in detail hereinabove.

Contained within the fuel tank 302 are components of a prior art fuel system 306, namely a filter 308, a fuel pump 310, a check valve 312, a filter 314 and a fuel pressure regulator 316, all of which were detailed hereinabove, as for example per the discussion of FIG. 1A. The operation of the fuel pump may be responsive to the fuel pressure regulator 316, to another source of pressure differential, or to the command of a controller. External to the fuel tank 302 are additional components of the prior art fuel system, as also discussed in detail hereinabove, namely: in a valve set 364 typically including a flow control valve 320, a service valve 322, an automatic fuel shut off solenoid valve 324 (which may also serve operationally as a two-way solenoid valve 352 of the present invention, as will be discussed below), and further downstream are another automatic fuel shut off solenoid valve 326, a vaporizer-regulator 328 and a fuel consumer 330.

In accordance with the third embodiment 350 of the present invention, provided additionally over the prior art fuel system components, are disposed within the valve set 364: the aforementioned two-way solenoid valve 352 which, as mentioned, may also serve in the capacity of an automatic fuel shut-off solenoid valve 324, a flow control check valve 354 similar to pressure control valve 320, a service valve 356 similar to service valve 322, a two-way solenoid valve 358, similar to two-way solenoid valve 352, 324, and external to the valve set 364: a filter 332 disposed in an upper location of the fuel tank whereby fuel vapor 304V enters thereinto at an inlet, and a check valve 360, which connects, via a junction 362, to the prior art fuel system. By comparison with FIG. 3, it will be noticed that FF2 is constituted by the filter 332, the flow control check valve 354, the service valve 356, the two-way solenoid valve 358, the check valve 360 and the junction 362, and that FF1 is generally constituted by the two-way solenoid valve 352 and the junction 362, wherein FF1 and FF2 are also mutually joined to the downstream prior art fuel system at the junction 362.

The two-way solenoid valves 352, 358 may be on-off, or proportional, as for example controlled by pulse width modulation (PWM) in a manner known in the art, and are controlled via a controller (not shown), as for example controller 256 of FIG. 7A.

In operation, the two-way solenoid valves 352,358 may be closed, partly opened or fully opened independently of each other. Given an open state of the two-way solenoid valves 352, 358, then the check valve 360 will deliver fuel vapor 304V when the fuel pump is not on (that is, it is not pumping liquid fuel), whereby fuel vapor 304V is extracted from the fuel tank 302 and delivered to the vaporizer-regulator 328. However, when the fuel pump is on (that is, it is pumping liquid fuel), then the check valve 360 is closed (by action of the liquid fuel pressure) such that liquid fuel 304L is delivered via FF1 to the vaporizer-regulator 328, while fuel vapor 304V via FF2 is shut off. Given the two-way solenoid valve 352 is open, if the two-way solenoid valve 358 is closed, then so, too, is FF2 closed, and independent of the state of operation of the fuel pump 310, liquid fuel 304L is exclusively delivered to the vaporizer-regulator 328 via FF1. Given the two-way solenoid valve 358 is open, if the two-way solenoid valve 352 is closed, so, too, is FF1 closed, and fuel vapor 304V is exclusively delivered to the vaporizer-regulator 328 via FF2.

A key advantage of the third embodiment relative to the second embodiment is more flexible control over the fuel flowing via FF1 and FF2.

Figure 11:
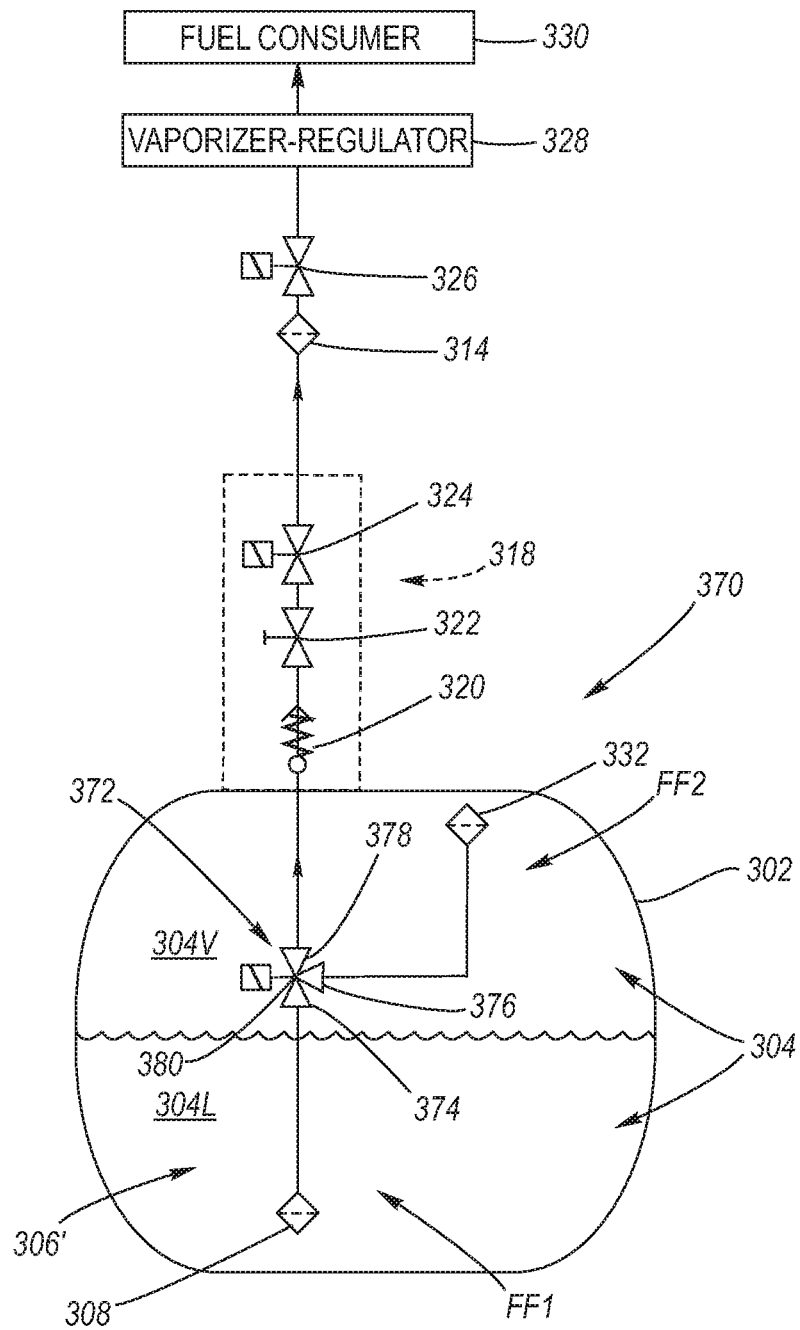
FIG. 11 is a schematic diagram of a gaseous-phase fuel system equipped with a fourth example of the fuel tank temperature and pressure management system according to the present invention.

Turning attention next to FIG. 11, a fourth exemplar embodiment 370 is depicted of the fuel tank temperature and pressure management system according to the present invention, in which control states CS3 through CS9, inclusive, of Table 1 are applicable thereto, and wherein numerals identical to FIG. 8 will be used to designate identical components.

In this LPG fuel system fourth embodiment 370, LPG fuel 304 in the top of the fuel tank 302 is a saturated fuel vapor (or simply, a vapor) 304V, and therebelow is disposed liquid fuel 304L, wherein the fuel may be any fuel stored at or near its vapor pressure, and need not be LPG.

The fuel tank 302 is equipped with a pressure relief valve, and may be equipped with a temperature sensor and a pressure sensor, not shown, but each component having been described in detail hereinabove; and the contents of the fuel tank may be subjected to various heats (not shown) as also described in detail hereinabove.

Figure 1C:
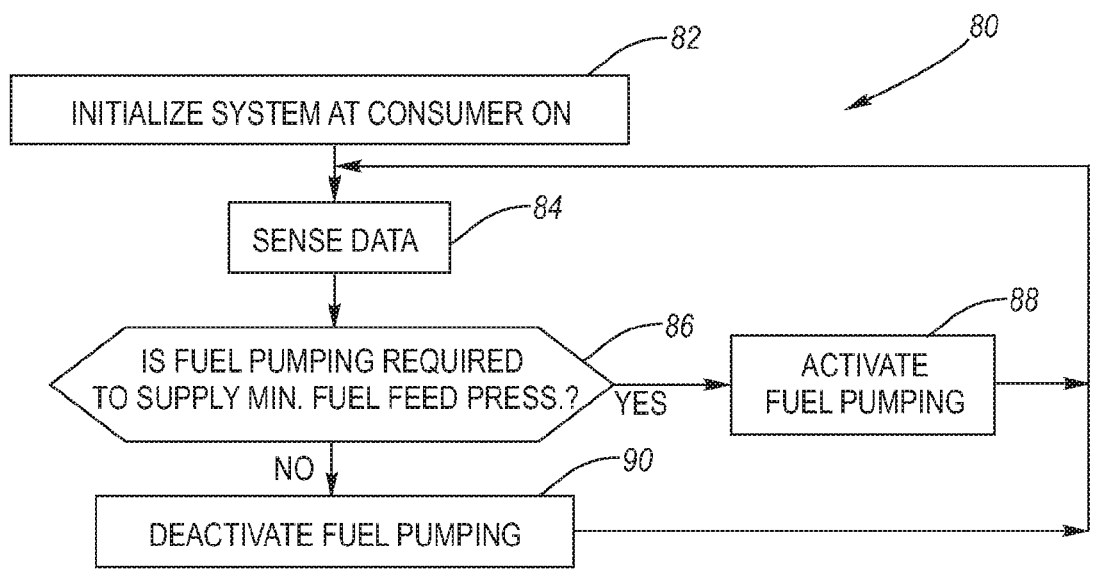
FIG. 1C is a prior art exemplar operational algorithm for the prior art fuel system of FIG. 1A.

Contained within the fuel tank 302 are components of a prior art fuel system 306', namely a filter 308 as detailed hereinabove, as for example per the discussion of FIG. 1B. External to the fuel tank 302 are additional components of the prior art fuel system, as also discussed in detail hereinabove, namely: a valve set 318 typically including a flow control valve 320, a service valve 322, and an automatic fuel shut-off solenoid valve 324, and further downstream are a fuel filter 314, another automatic fuel shut off solenoid valve 326, a vaporizer-regulator 328 and a fuel consumer 330.

In accordance with the fourth embodiment 370 of the present invention, provided additionally over the prior art fuel system components, are: a filter 332 disposed in an upper location of the fuel tank, whereby fuel vapor 304V enters thereinto at an inlet; and a three-way solenoid valve 372 having a first inlet 374 connected to the filter 308 of the prior art fuel system 306', a second inlet 376 connected to the filter 332 of the present invention, and an outlet 378 connected to the prior art fuel system upstream of the valve set 318. By comparison with FIG. 3, it will be noticed that FF2 is constituted by a portion of the three-way solenoid valve 372 and the filter 332, and that FF1 is generally constituted by a portion of the three-way solenoid valve 372 and the filter 308 (except in cases where fuel filter 308 is already included in the prior art fuel system upstream of three-way solenoid valve 372), wherein the three-way solenoid valve 372 serves as the junction 380 where FF1 and FF2 are mutually joined and connected to the downstream prior art fuel system.

The three-way solenoid valve 372 may be on-off, or proportional with respect to each of the first and second inlets 374, 376 and is controlled via a controller (not shown), as for example controller 256 of FIG. 7A.

In operation, the first and second inlets 374, 376 are fully opened, partly opened, or closed in concert with one another to ensure fuel delivery meets fuel demand of the fuel consumer 330 as well as functionality under the present invention. Given an open state of the first inlet 374 and a closed state of the second inlet 376, then liquid fuel 304L will be exclusively delivered by FF1. Given a closed state of the first inlet 374 and an open state of the second inlet 376, then fuel vapor 304V will be exclusively delivered by FF2. Given an open state of the first inlet 374 and an open state of the second inlet 376, then both liquid fuel 304L and fuel vapor 304V will be delivered by FF1 and FF2, respectively, in a proportion related to the relative proportionality of the open states.

A suitable three-way solenoid valve is a Skinner A-Series three-way valve available through Parker Fluid Control Division, Parker Hannifin Corp. of New Britain, Conn.

Figure 12:
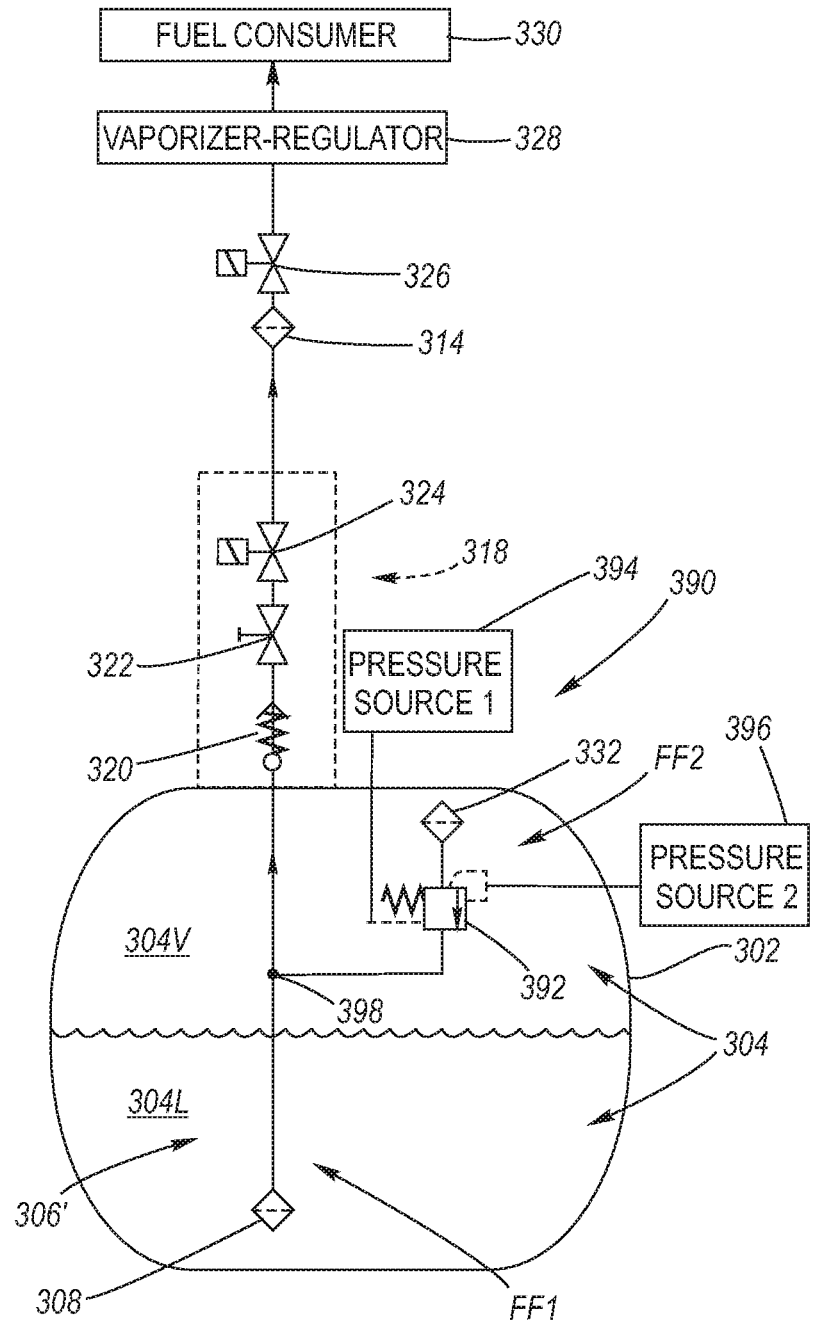
FIG. 12 is a schematic diagram of a gaseous-phase fuel system equipped with a fifth example of the fuel tank temperature and pressure management system according to the present invention.

Turning attention now to FIG. 12, a fifth exemplar embodiment 390 is depicted of the fuel tank temperature and pressure management system according to the present invention, in which control states CS3, CS4 and CS7 of Table 1 are applicable thereto, and wherein numerals identical to FIG. 8 will be used to designate identical components.

In this LPG fuel system fifth embodiment 390, LPG fuel 304 in the top of the fuel tank 302 is a saturated fuel vapor (or simply, a vapor) 304V, and therebelow is disposed liquid fuel 304L, wherein the fuel may be any fuel stored at or near its vapor pressure, and need not be LPG.

The fuel tank 302 is equipped with a pressure relief valve, and may be equipped with a temperature sensor and a pressure sensor, not shown, but each component having been described in detail hereinabove; and the contents of the fuel tank may be subjected to various heats (not shown) as also described in detail hereinabove.

Contained within the fuel tank 302 are components of a prior art fuel system 306', namely a filter 308 as detailed hereinabove, as for example per the discussion of FIG. 1B. External to the fuel tank 302 are additional components of the prior art fuel system, as also discussed in detail hereinabove, namely: a valve set 318 typically including a flow control valve 320, a service valve 322, and an automatic fuel shut-off solenoid valve 324, and further downstream are a fuel filter 314, another automatic fuel shut off solenoid valve 326, a vaporizer-regulator 328 and a fuel consumer 330.

In accordance with the fifth embodiment 390 of the present invention, provided additionally over the prior art fuel system components, are: a filter 332 disposed in an upper location of the fuel tank, whereby fuel vapor 304V enters thereinto at an inlet, and a pressure activated valve 392, as for example a diaphragm valve, having a pair of pressure references 394, 396, and being connected to the prior art fuel system at a junction 398. By comparison with FIG. 3, it will be noticed that FF2 is constituted by the junction 398, the pressure activated valve 392 and the filter 332, and that FF1 is generally constituted by the junction 398 and filter 308 (except in cases where fuel filter 308 is already included in the prior art fuel system upstream of junction 398), wherein FF1 and FF2 are also mutually joined at the junction 398 and connected to the downstream prior art fuel system.

The pressure activated valve is controlled by the pressure difference between Pressure source 1 394 and Pressure source 2 396. Pressure source 2 396 is the fuel feed pressure, which can be taken at any location between the fuel tank 302 and the vaporizer-regulator 328. From a control perspective, a preferred location for Pressure source 2 is upstream of, and adjacent to, the vaporizer-regulator, however measuring Pressure source 2 inside the fuel tank is preferred from a safety perspective, as this does not introduce additional risk of fuel leaking from the fuel tank via a pressure reference line. Pressure source 1 394 is a reference pressure which may be a fuel feed location downstream of the vaporizer-regulator, or the pressure inside an inlet manifold of the fuel consumer 330, or the atmosphere, or a sealed cavity inside the fuel tank (preferred from a safety perspective, as this does not introduce additional risk of fuel leaking from the fuel tank via a pressure reference line). The pressure activated valve 392 may be on-off, or proportional.

In operation, in response to pressure differential as between pressure source 1 394 and pressure source 2 396, the pressure activated valve 392 will switch between fully open, or partly open and closed states. When in an open state of the pressure activated valve 392, fuel vapor 304V via FF2 will be extracted, which extraction may include liquid fuel via FF1 in variable ratio related to the relative openness of the valve. When in the closed state of the pressure activated valve 392, only liquid fuel 304L via FF1 will be extracted.

A suitable pressure activated valve is based on a common automotive fuel system gasoline pressure regulator, but having the reference pressure vent, on the control side of the diaphragm blocked, and the cavity on this side of the diaphragm either evacuated or filled with an inert gas, such as nitrogen under controlled conditions (e.g., 25 degrees C. at 1 bar absolute).

It is to be noted that with respect to the various exemplar embodiments discussed hereinabove, that various features can be modified among the various embodiments, e.g., adding or removing a fuel pump, adding or removing check valves or otherwise by modifying the configurations to yet provide a synergistic result in accordance with the present invention. For example, in the various embodiments discussed hereinabove, the junction which joins FF1 to FF2 is disposed above the level of the liquid fuel in the fuel tank, however this is not a requirement for all embodiments. For example, the fourth embodiment depicted in FIG. 11 could be configured to control the fuel flow from FF1 and FF2, even if junction 380 were located below the level of the liquid fuel in the fuel tank.

Figure 13:
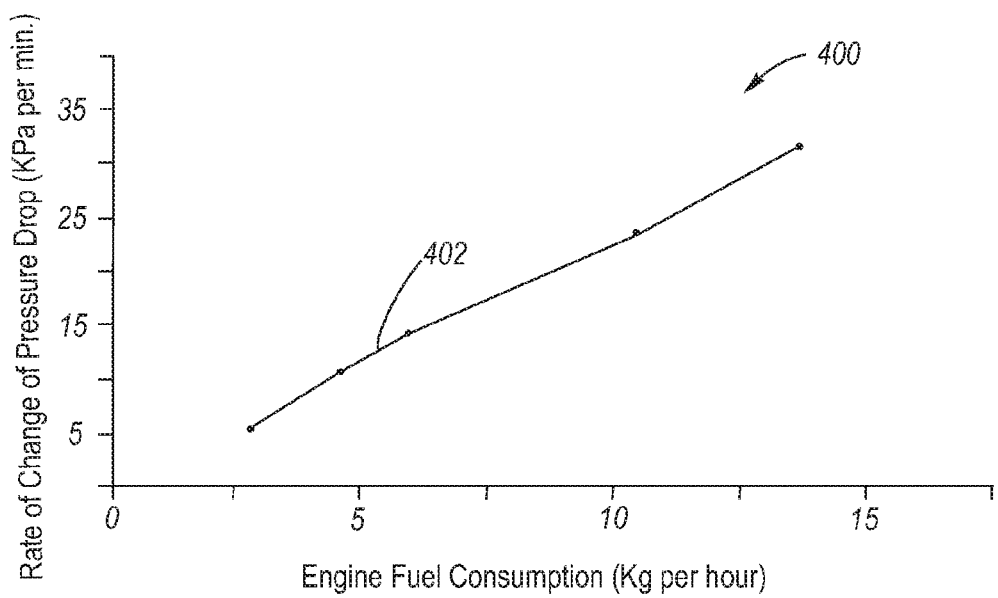
FIG. 13 is a graph of rate of change of fuel tank pressure versus fuel consumption obtained during a test conducted using the embodiment of FIG. 10.

In concluding the discussion of the exemplar embodiments, FIG. 13 depicts a graph 400 of engine fuel consumption versus rate of change of pressure drop in a fuel tank during a test performed on a motor vehicle having a fuel system as generally configured according to FIG. 10. The exemplar plot 402 was obtained by artificially heating the fuel tank using an electric heat mat set at 43 degrees C. The test involved an 1800 kg, 4 door sedan, powered by a V6 internal combustion engine fuel consumer designed to be fuelled with LPG. The vehicle was tested on a dynamometer, whereby the fuel flow rate to the engine, the LPG tank temperature and pressure, and the vehicle load were monitored. The vehicle was operated at various speeds and fuel flow rates (load) and the data taken. Calculations from the data were made (e.g., dividing the pressure drop that occurred over a certain time, by that time to determine the 'Rate of Change of Pressure Drop') to determine the graph data.

Figure 14:
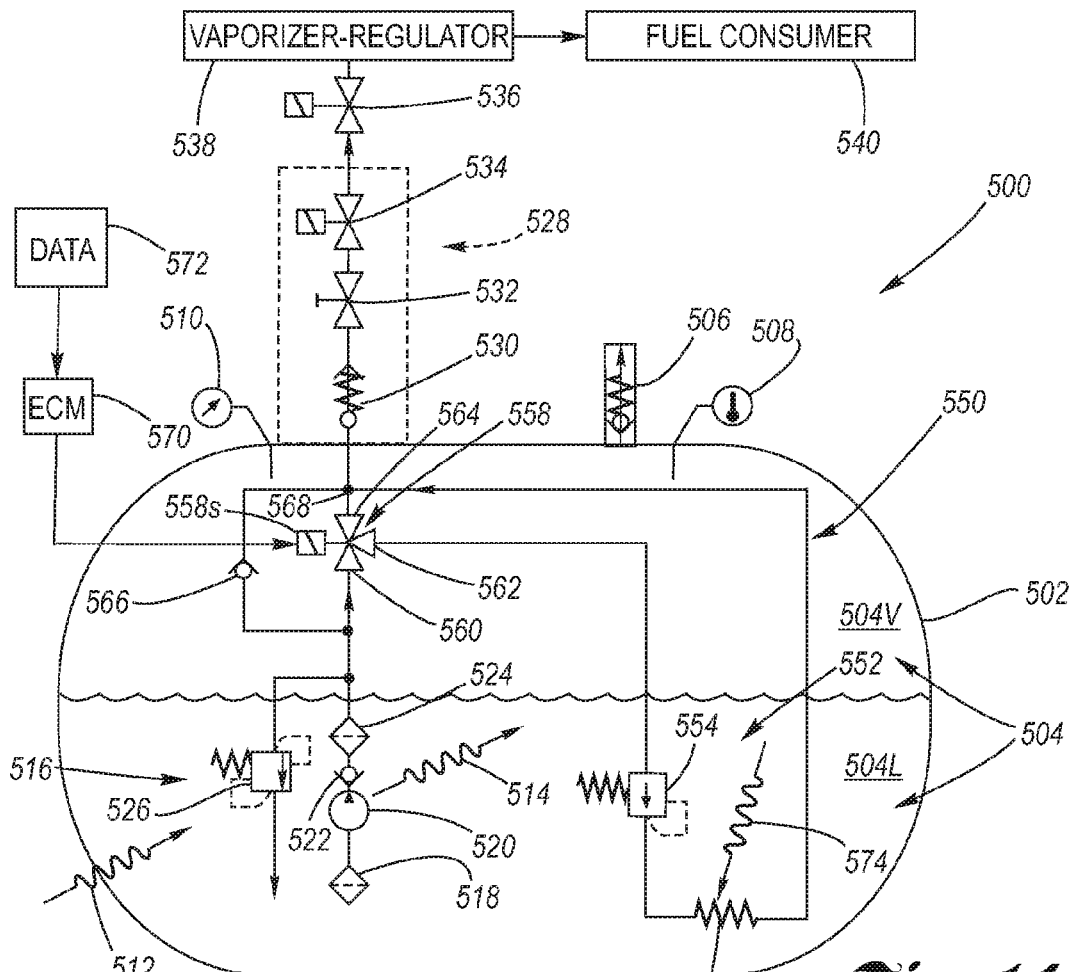
FIG. 14 is a schematic diagram of a gaseous-phase fuel system equipped with a sixth example of the fuel tank temperature and pressure management system according to the present invention, now including an in-tank evaporator system.

Turning attention now to FIG. 14, shown is an exemplar embodiment 500 of the fuel tank temperature and pressure management system, wherein now rather than selectively extracting native vapor from the fuel tank, the vapor is selectively extracted in conjunction with an in-tank evaporator system 550.

In this LPG fuel system embodiment 500, LPG fuel 504 in the top of the fuel tank 502 is a saturated fuel vapor (or simply, a vapor) 504V, and therebelow is disposed liquid fuel 504L, wherein the fuel may be any fuel stored at or near its vapor pressure, and need not be LPG.

The fuel tank 502 is equipped with a pressure relief valve 506, and may be equipped with a temperature sensor 508 and a pressure sensor 510, each component having been described in detail hereinabove; and the LPG fuel 504 may be subjected to various external and internal heats 512, 514, as also described in detail hereinabove.

Contained within the fuel tank 502 are components of a prior art fuel system 516, namely a filter 518 (which is shown serving as an inlet disposed in the liquid fuel 504L), a fuel pump 520, a check valve 522, a filter 524 and a fuel pressure regulator 526, all of which were detailed hereinabove, as for example per the discussion of FIG. 1A. The operation of the fuel pump may be responsive to the fuel pressure regulator 526, to another source of pressure differential, or to the command of a controller. External to the fuel tank 502 are additional components of the prior art fuel system, as also discussed in detail hereinabove, namely: a valve set 528 typically including a flow control valve 530, a service valve 532, and an automatic fuel shut-off solenoid valve 534, and further downstream are another automatic fuel shut off solenoid valve 536, a vaporizer-regulator 538 and a fuel consumer 540.

In accordance with the embodiment 500 of the present invention, provided additionally over the prior art fuel system components, is an in-tank evaporator system 550, including: an in-tank evaporator assembly 552 composed of a fuel feed regulator 554 connected to an in-tank evaporator 556, an evaporator flow control preferably in the form of a three-way solenoid valve 558 having an inlet 560 connected to the prior art fuel system 516, a first outlet 562 connected to the in-tank evaporator assembly 552, and a second outlet 564 connected to the prior art fuel system upstream of the valve set 528, and a check valve 566 which prevents excessive pressure build-up downstream of the regulator 554 and three-way solenoid valve 558.

The three-way solenoid valve 558 may be on-off, or proportional, as for example the solenoid 558s thereof being controlled by pulse width modulation (PWM) in a manner known in the art, with respect to each of the inlet 560 and the first and second outlets 562, 564, via a controller 570 which is programmed to respond to input data 572.

In operation, the controller 570 receives data 572, such as for example fuel feed pressure data upstream of the vaporizer-regulator 538, and, based upon its programming, selectively actuates the solenoid 558s to thereby selectively operate the three-way solenoid valve 558 to open or proportionally open or to close either of the first and second outlets 562, 564. When, for example, the inlet 560 and the second outlet 564 are in an open state and the first outlet 562 is in a closed state, liquid fuel 504L will be extracted from the tank 502 without passing through the in-tank evaporator assembly 552. When, for example, the inlet 560 and the first outlet 562 are in an open state and the second outlet 564 is in a closed state, then liquid fuel 504L will flow into the in-tank evaporator system 552, passing through the fuel feed regulator 554, in which the pressure and temperature of the fuel will drop and some fuel vaporization may occur. Additional vaporization will take place in the in-tank evaporator 556, which is located downstream of fuel feed regulator 554 and which absorbs the latent heat of evaporation 574, from the liquid fuel 504L. In addition, the pressure drop across fuel feed regulator 554, will typically result in a second heat transfer mechanism; namely: the heat required to expand the portion of fuel which is in its gaseous phase. If the temperature of the fuel downstream of fuel feed regulator 554 is below the Joule-Thompson inversion temperature for the gaseous phase of the fuel, then expansion of the fuel will result in additional cooling of the fuel tank contents. The resultant cooling of the fuel 504 inside the fuel tank 502 by one or both of these heat transfer mechanisms serves to reduce the vapor pressure of the fuel 504 in the fuel tank, and the resulting vapor-liquid proceeds to the junction 568 and then downstream to the vaporizer-regulator 538.

The fuel feed regulator 554, reduces the downstream pressure to, for non-limiting example, about 8 bar (absolute), to ensure the fuel consumer 540 is not starved of fuel and to avoid excessive cooling when the fuel tank pressure is low, as well as to minimize the fuel pump power requirement. The fuel feed regulator 554 should be configured for a full-open condition in the event of a failure. The check valve 566 ensures that the pressure at the intersection 568 is not significantly higher than the pressure upstream of the fuel flow regulator 526 (which might otherwise be the case when, for example, there is heat flow to the fuel in the fuel line between the fuel tank and vaporizer-regulator, but there is little or no fuel flow to the fuel consumer). The fuel feed regulator 554 and the in-tank evaporator 556 should be submerged in the liquid fuel 504L and/or mounted to good heat conductors with respect to the fuel tank 502 and its contents.

In view of the extensive descriptions of the various embodiments hereinabove, it is clear that the embodiment of FIG. 14 can also be modified, e.g., by removing the fuel pump 520, check valve 522 and fuel pressure regulator 526 so that the liquid fuel extraction via the fuel feed line is provided by the vapor pressure in the fuel tank, as for example exemplified at FIG. 11.

General considerations for implementation of the present invention will now be discussed.

In that the present invention is applicable to fuel which is stored at or near vapor pressure and fuel consumers which are adapted to consume this fuel in a gaseous-phase (superheated vapor), the liquid fuel drawn from the fuel tank needs to be vaporized and superheated and the fuel pressure (typically) reduced (relative to the fuel tank storage pressure) prior to being supplied to the fuel consumer. These changes need to take place somewhere between the fuel tank and the fuel consumer. The present invention exploits these requirements (i.e., the need to vaporize, superheat and/or reduce the pressure of fuel coming from the fuel tank somewhere between the fuel tank and the fuel consumer) to help manage the temperature and pressure within the fuel tank and to thus keep the fuel tank within an optimum pressure range which lies below a predetermined vapor pressure threshold. To achieve this functionality with low additional risk and a good cost to benefit ratio, the present invention: (a) carries-over, where possible, prior art fuel system components and control systems; (b) is controlled by a simple but robust and low-cost control system; and (c) takes potential failure modes (such as fuel starvation under high fuel flow conditions) into account.

The present invention provides three different mechanisms of temperature and pressure management. The first mechanism is to selectively (e.g., on the basis of an input such as fuel tank pressure) remove high vapor pressure components from the fuel tank by withdrawing fuel vapor rather than liquid fuel from the fuel tank. The second mechanism is to selectively (e.g., on the basis of an input such as fuel tank pressure) evaporate liquid fuel inside the fuel tank and to draw the required latent heat of vaporization from the fuel inside the fuel tank (first preference), and/or the fuel tank body itself, or other hardware which is thermally connected to the fuel tank body (second preference). The third mechanism is to selectively (e.g., on the basis of an input such as fuel tank pressure) reduce the pressure of the fuel, before the fuel line passes outside of the fuel tank, and to draw the required heat of expansion from the same sources as above. This third mechanism requires the temperature of the gas which is expanded to lie below its Joule-Thompson inversion temperature. It is believed that the robustness and cost to benefit ratio of cooling the fuel tank contents using the third mechanism may not be as favorable as that of using the second mechanism; however for systems where the vapor fuel flow out of the fuel tank is small and/or the unwanted heat transfer to the fuel tank from external sources is large, it may be necessary to exploit both of these mechanisms in order to achieve the necessary degree of fuel tank cooling.

In accordance with a first aspect of the present invention, the fuel tank of a pressurized fuel system is able to be refilled at an acceptably high rate, in that the vapor pressure in the fuel tank is kept within a predetermined vapor pressure range, suitable for proper operation of the fuel consumer (e.g., an internal combustion engine) and suitable for a desired rate of refilling as per an anticipated pressure of the bowser nozzle. By extracting fuel vapor, some of the liquid fuel will boil in order to replace the extracted fuel vapor so as to maintain a vapor-liquid equilibrium (this is in addition to the small amount of fuel that boils off to fill the volume which is vacated by liquid fuel as it is consumed by both the prior art fuel system, as well as the fuel system using the present invention). When the liquid fuel changes state from liquid phase to vapor phase, the latent heat of vaporization involved will cause the fuel temperature to drop. The amount of latent heat involved in this process can be, by way of example, on the order of hundreds of Watts, and may be more than 1 KW under high fuel flow conditions. By way of example, since LPG is essentially a mixture of propane and butane the expected latent heat involves the proportional latent heat of propane which is about 356 KJ per Kg and the proportional latent heat of butane which is about 320 KJ per Kg, inclusive of potential nucleate boiling which may occur below the surface of the liquid, as well as evaporation at the surface of the liquid.

In accordance with a second aspect of the present invention, extracting the fuel as a vapor will reduce the required heat needed to be supplied by the vaporizer. If, for example, the vaporizer is heated by an electric heater, then one potential benefit of this reduced heat requirement is lower electrical power consumption (which translates to improved fuel consumption); this benefit may be particularly significant for a fuel consumer in the form of an internal combustion engine during warm-up and/or under low-load, cold-ambient conditions. Other potential benefits are increased coolant temperature (which translates to improved cabin heating) during engine warm-up, as well as improved ability to maintain the desired engine temperature (by preventing the engine coolant temperature from dropping) under low-load, cold ambient conditions.

With respect, by way of example, to the application of this invention to an LPG fuel system for a motor vehicle: the fuel line has to be kept at a pressurization to supply a full load condition of the fuel consumer; leakage paths (as for example due to a diaphragm failure) and moisture ingress need to be prevented; and the sizes of hoses, etc., may need to be sized to accommodate the increased volume flow rate of fuel vapor relative to liquid fuel.

With regard to selecting the vapor pressure thresholds for implementing the present invention with respect to a vehicular LPG fuel system, from the standpoint of ensuring that the fuel system is capable of supplying fuel at full load of the fuel consumer without unnecessarily activating the in-tank fuel pump, it may be preferable to keep the vapor pressure inside the fuel tank above a lower threshold, such as 3 bar (absolute); but from the standpoint of maintaining a vapor pressure inside the fuel tank which allows for reasonably rapid fuel tank refilling, it may also be desirable to keep the vapor pressure inside the fuel tank below an upper threshold, which may lie somewhere in the range 5 to 10 bar (absolute) depending on variables such as the chemical composition of the fuel and the anticipated range of supply pressures at the bowser nozzle. It should be noted that the vapor pressure threshold may be compound, wherein below a first vapor pressure threshold, liquid fuel is (preferably only) selected for delivery, above a second (higher) vapor pressure threshold fuel vapor is (preferably only) selected for delivery, and therebetween a mixture of liquid fuel and fuel vapor are selected for delivery.

One potential disadvantage of drawing fuel vapor rather than liquid fuel out of the LPG tank is that the fuel volume flow rate and, therefore, the pressure required to pump a given mass of fuel through the fuel system will be higher. If the required pressure is higher than the available pressure, then the amount of fuel reaching the fuel consumer will drop, potentially resulting in fuel starvation. The likelihood of experiencing fuel starvation increases as the fuel flow to the fuel consumer increases and as the pressure inside the fuel tank decreases. One means of addressing this potential disadvantage is to fit hardware (such as valves and pipes) which have larger internal dimensions, however this solution will typically also result in undesirable increases in cost, mass and packaging volume. An alternative is to use the same size valves and pipes as that used by liquid-feed fuel systems, but to switch from vapor fuel feed to liquid fuel feed above a predetermined fuel mass flow threshold. This solution may be implemented as follows: the fuel pressure at entry to the vaporizer (for example) is detected, and this information is input to a controller. Under high fuel flow operating conditions, which is typically fuel feed pressure dependent, the controller, per its programming, will selectively cause the solenoid of a two-way or of a three-way solenoid valve (merely by example) to switch state so as to allow liquid fuel flow, wherein the switch of state may be an off/on switch of state or a proportional switch of state.

Excessive cooling of the fuel tank may be undesirable from the following perspectives: (a) increased electrical power consumption and increased fuel pump durability requirement if the fuel tank pressure is below the fuel pump activation pressure threshold; (b) increased ice and/or water condensate forming on the outside of the fuel tank and dripping off; (c) over-cooling (sometimes referred to as 'icing-up') of LPG hardware connected to the fuel tank; and (d) skin contact with a cold fuel tank fittings during fuel tank refilling. To prevent the fuel tank from getting too cold, the present invention retains the ability to feed fuel to the engine in a liquid phase. In addition, there is also the possibility of artificially heating the fuel tank. This may be done with an electrical heater, or by utilizing fuel pump energy (e.g., running the fuel pump at maximum output, with most of the flow passing back to the fuel tank via the fuel pump pressure regulator, even if this volume flow of fuel is not required to maintain fuel rail pressure).

Operatively, the present invention includes two categories of systems, electronically-controlled and mechanically-controlled. Electronically-controlled systems utilize electrically-controlled valves and/or regulators to provide the aforesaid aims, as for example, the above described controller controlled three-way solenoid valve of FIG. 11. Mechanically-controlled systems utilize mechanically-controlled valves and/or regulators to provide the aforesaid aims, as for example the above described pressure controlled fuel feed regulator of FIG. 12.

With regard to implementation of the present invention in embodiments including a fuel pump, the fuel pump is typically activated if the fuel tank pressure is below a minimum regulator feed pressure (typically 3 to 4 bar (absolute) in the case of LPG fuel systems) and disabled above this pressure (this is known in the prior art). However, in accordance with the present invention, the fuel pump may be operated up to a threshold vapor pressure (which is higher than the minimum regulator feed pressure; probably somewhere in the range 5 to 10 bar (absolute)) to warm the fuel (as for example due to an over-cooled situation) or increase the pressure inside the fuel tank, and disabled at a higher threshold vapor pressure to allow for cooling of the fuel, as per the present invention.

With regard to aspects relating to FF1, FF2 and the junction between FF1 and FF2, because the fuel in the fuel tank is by definition at its vapor pressure, FF2 will typically contain some condensed liquid (typically in the form of small liquid droplets) and FF1 will typically contain some evaporated gas (typically in the form of small gas bubbles). The junction needs to be located above the level of liquid inside the fuel tank (if not, vapor will be inhibited from flowing into the junction). To avoid damage to the fuel pump, the junction should also be located downstream of the fuel pump. The junction may be located upstream or downstream of the fuel filter (if downstream, then the vapor feed line will need to be fitted with a second fuel filter (which is undesirable from cost, mass and packaging perspectives)). The junction may be located inside or outside the fuel tank (if the junction is located outside the fuel tank, a second fuel feed line and additional safety hardware would be required, as per FIG. 10.

With regard to the fuel vapor inlet of FF2 (which may be the inlet of the FF2 fuel filter), the fuel vapor inlet must be located in the vapor space at the top of the fuel tank and should be preferably located as high as possible above the anticipated range of surface heights of the liquid fuel (that is, above the maximum permitted liquid fuel surface height inside the fuel tank) in order to reduce the likelihood of accidental liquid entry into the fuel vapor inlet (e.g., by splashing). In this regard, the fuel vapor inlet may be fitted with a splash shield for this purpose, and, as mentioned, the fuel vapor inlet should be preferably fitted with a fuel filter to prevent the ingress of undesirable contaminants. Further, with regard to the FF2 fuel feed line, in order to provide low flow resistance to fuel vapor flow, the minimum cross-section of the FF2 fuel feed line should preferably be the same as, or greater than, the minimum cross-section of the FF1 fuel feed line.

With regard to the flow control(s): (a) when in the closed state, internal leakage flow therethrough should be as low as possible; (b) when in the fully open state, the differential pressure thereacross should be as low as possible (to meet maximum fuel demand); and (c) implementation of switching from open and closed states may be implemented responsive to fuel pressure at a location which may be inside the fuel tank, and/or outside the fuel tank (as for example immediately upstream of the vaporizer-regulator). Valving of the flow control(s) should enable varying of the ratio of mass flow of liquid fuel to mass flow of vapor fuel into the fuel line going to the vaporizer-regulator so as to increase or decrease the fuel tank temperature at will. Valving functionality can be achieved by utilizing a flow control in the form, for example, of a three-way solenoid valve, two or more two-way solenoid valves, or another suitable configuration. The valving may be operatively regulated by step control (i.e., two or more distinct ratios) or continuously variable control of mass flow of liquid fuel to mass flow of fuel vapor into the fuel feed line, ideally capable of operating at any mass flow of liquid fuel and mass flow of fuel vapor ratio between determined (as for example empirically determined) upper and lower limits.

By way merely of exemplification, a typical LPG fuel system for an automotive application may have the following parameters: (a) the fuel tank pressure relief valve typically opens at a pressure of 26 to 28 bar (absolute); (b) the fuel rail pressure is typically 1 to 2 bar above inlet manifold pressure and is maintained by a regulator. To maintain this pressure, the fuel feed pressure on the upstream side of the regulator needs to be higher, as for example 3 to 4 bar (absolute), whereby the fuel pump is typically activated when the pressure inside the fuel tank falls below approximately 3 bar (absolute). From the perspective of eliminating unwanted no-fill fuel tank refilling situations, it is desirable to keep the fuel tank pressure below approximately 8 bar (absolute).

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for fuel tank temperature and pressure management for a fuel system utilizing a gaseous-phase fuel adapted fuel consumer, wherein the fuel is stored in the fuel tank as both liquid fuel and fuel vapor at substantially near a vapor pressure of the fuel, and wherein said fuel system is free of a return path from said fuel consumer to said fuel tank, said method comprising the steps of:
   obtaining fuel feed pressure of the fuel system;
   selectively extracting fuel from the fuel tank as substantially liquid fuel; and
   selectively extracting fuel from the fuel tank as substantially fuel vapor;
   wherein said steps of selectively extracting fuel provide the fuel system downstream of the fuel tank with fuel that is a variable ratio of the liquid fuel to the fuel vapor, said fuel comprising a mixture of said liquid fuel and said fuel vapor responsive to said step of obtaining to thereby provide at least one of: a) temperature and pressure regulation of the fuel within the fuel tank; and b) said fuel vapor to a vaporizer of the fuel system which is incompletely vaporizing said liquid fuel.

2. The method of claim 1, wherein said steps of selectively extracting fuel provide selective removal from the fuel tank of chemical components of the fuel having relatively higher volatility.

3. The method of claim 1, wherein said steps of obtaining and selectively extracting regulate the temperature and pressure of the fuel within the tank so that the pressure of the fuel within the fuel tank is generally kept below a predetermined pressure threshold which is related to refilling of the fuel tank.

4. The method of claim 1, wherein a minimum fuel feed pressure is required for operation of the fuel consumer; and wherein in said steps of selectively extracting, if the obtained fuel feed pressure is greater than or equal to the minimum fuel feed pressure, then the proportion of the fuel vapor in the ratio is increased.

5. The method of claim 4, wherein the proportion of the fuel vapor in the ratio is increased provided fuel pressure within said fuel tank is between a predetermined upper threshold pressure and a predetermined lower threshold pressure.

6. The method of claim 1, wherein said step of selectively extracting fuel from the fuel tank as substantially fuel vapor comprises extraction of native fuel vapor from the fuel tank which upsets a vapor-liquid equilibrium of the fuel in the fuel tank so as to thereby cool the fuel in the fuel tank.

7. The method of claim 1, wherein said step of selectively extracting fuel from the fuel tank as substantially fuel vapor comprises an in-tank evaporation process which absorbs latent heat to thereby cool the fuel in the fuel tank.

8. The method of claim 1, wherein said step of selectively extracting fuel from the fuel tank as substantially fuel vapor comprises at least one of:
- extraction of native fuel vapor from the fuel tank which upsets a vapor-liquid equilibrium of the fuel in the fuel tank so as to thereby cool the fuel in the fuel tank;
- an in-tank evaporation process which absorbs latent heat to thereby cool the fuel in the fuel tank; and
- an in-tank pressure reduction process which absorbs the heat of expansion so as to thereby cool the fuel in the fuel tank.

9. The method of claim 1, wherein said step of selectively extracting fuel from the fuel tank as substantially fuel vapor comprises both of:
- an in-tank evaporation process which absorbs latent heat to thereby cool the fuel in the fuel tank; and
- an in-tank pressure reduction process which absorbs the heat of expansion so as to thereby cool the fuel in the fuel tank.

10. The method of claim 1, wherein said steps of obtaining and selectively extracting provide at least one of cooling and heating of the fuel within the fuel tank.

11. The method of claim 1, wherein said steps of selectively extracting are performed by mechanically-controlled flow control devices.

12. The method of claim 1, wherein said steps of selectively extracting are performed by electronically-controlled flow control devices.

13. In an apparatus for managing fuel tank temperature and pressure of a fuel system utilizing a gaseous-phase fuel adapted fuel consumer, wherein the fuel is stored as both liquid fuel and fuel vapor at substantially near a vapor pressure of the fuel, said fuel system being free of a return path from said fuel consumer to said fuel tank, said apparatus comprising:
- a fuel tank;
- a vaporizer;
- a fuel line connecting said vaporizer to said fuel tank;
- a first fuel feed line having an inlet in fluidic communication with liquid fuel within said fuel tank;
- a second fuel feed line having an inlet in fluidic communication with fuel vapor within said fuel tank;
- a junction fluidically connecting said first fuel feed line to said second fuel feed line and to said fuel line downstream of said first and second fuel feed lines; and
- a flow control connected to at least one of said first and second fuel feed lines;
- the improvement thereto comprising:
- said flow control adjusting fuel flow relatively with respect to the liquid flow of said first fuel feed line to said junction and fuel vapor flow of said second fuel feed line to said junction as a variable ratio of liquid fuel to fuel vapor comprising a mixture of said liquid fuel and said fuel vapor responsive to a predetermined relationship with respect to fuel feed pressure in the fuel system to thereby provide at least one of: a) temperature and pressure regulation of the fuel within the fuel tank; and b) said fuel vapor to said vaporizer if said vaporizer is incompletely vaporizing said liquid fuel.

14. The apparatus of claim 13, wherein said flow control comprises at least one solenoid valve connected with at least one of said first fuel feed line and said second fuel feed line.

15. The apparatus of claim 13, wherein said flow control and said junction comprise a three-way solenoid valve having a first inlet connected to said first fuel feed line, a second inlet connected to said second fuel feed line, and an outlet connected to said fuel line downstream of said first and second fuel feed lines.

16. The apparatus of claim 13, wherein said flow control comprises a pressure activated valve connected with said second fuel flow line, said pressure activated valve varying fuel vapor flow to said junction responsive to changes in fuel feed pressure with respect to a reference pressure.

17. An apparatus for managing fuel tank temperature and pressure of a fuel system utilizing a gaseous-phase fuel adapted fuel consumer, wherein the fuel is stored as both liquid fuel and fuel vapor at substantially near a vapor pressure of the fuel, said apparatus comprising:
- a fuel tank;
- a vaporizer;
- a fuel line connecting said vaporizer to said fuel tank;
- a first fuel feed line having an inlet in fluidic communication with liquid fuel within said fuel tank;
- a second fuel feed line having an inlet in fluidic communication with fuel vapor within said fuel tank;
- a junction fluidically connecting said first fuel feed line to said second fuel feed line and to said fuel line downstream of said first and second fuel feed lines; and
- a flow control connected to at least one of said first and second fuel feed lines, said flow control adjusting fuel flow relatively with respect to the liquid flow of said first fuel feed line to said junction and fuel vapor flow of said second fuel feed line to said junction;
- wherein said flow control adjusts the fuel flow as a variable ratio of liquid fuel to fuel vapor, said fuel comprising any of: a) all said liquid fuel, b) all said fuel vapor and c) a mixture of said liquid fuel and said fuel vapor, responsive to a predetermined relationship with respect to fuel feed pressure in the fuel system to thereby provide at least one of: a) temperature and pressure regulation of the fuel within the fuel tank; and b) said fuel vapor to said vaporizer if said vaporizer is incompletely vaporizing said liquid fuel; and
- wherein said flow control comprises:
  - a fuel pump connected with said first fuel feed line; and
  - a check valve connected to said second fuel feed line in operatively responsive relation to liquid fuel pumped by said fuel pump;
  - wherein flow of fuel vapor from said second fuel feed line to said junction is regulated by pumping of fuel by said fuel pump.

18. The apparatus of claim 17, wherein said flow control further comprises at least one solenoid valve connected with at least one of said first feed fuel line and said second fuel feed line.

19. An apparatus for managing fuel tank temperature and pressure of a fuel system utilizing a gaseous-phase fuel adapted fuel consumer, wherein the fuel is stored as both liquid fuel and fuel vapor at substantially near a vapor pressure of the fuel, said apparatus comprising:
- a fuel tank;
- a vaporizer;
- a fuel line connecting said vaporizer to said fuel tank;

an in-tank evaporator assembly disposed within said fuel tank;

an inlet in fluidic communication with liquid fuel within said fuel tank;

an evaporator flow control connected to said inlet and said in-tank evaporator assembly, said evaporator flow control adjusting fuel flow from said inlet into said in-tank evaporator assembly; and at least one junction fluidically connecting said inlet to said in-tank evaporator assembly and to said fuel line downstream of said evaporator flow control;

wherein said evaporator flow control adjusts the fuel flow into said in-tank evaporator assembly in order to provide vaporization of fuel passing therethrough such that a variable ratio of liquid fuel to fuel vapor is provided responsive to a predetermined relationship with respect to fuel feed pressure in the fuel system to thereby provide at least one of: a) temperature and pressure regulation of the fuel within the fuel tank; and b)) said fuel vapor to said vaporizer if said vaporizer is incompletely vaporizing said liquid fuel.

20. The apparatus of claim 19, wherein said in-tank evaporator assembly comprises:

a fuel feed regulator; and an in-tank evaporator disposed downstream of said fuel feed regulator.

* * * * *